United States Patent
Bosloy et al.

(10) Patent No.: US 7,081,987 B2
(45) Date of Patent: Jul. 25, 2006

(54) COORDINATED CONTROL OF DYNAMIC GAIN EQUALIZATION IN A WAVELENGTH DIVISION MULTIPLEXED OPTICAL SYSTEM

(75) Inventors: Jonathan L. Bosloy, Kanata (CA); Lacramioara Pavel, Ottawa (CA)

(73) Assignee: PTS Corporation, San Jose, CA (US)

( * ) Notice: Subject to any disclaimer, the term of this patent is extended or adjusted under 35 U.S.C. 154(b) by 799 days.

(21) Appl. No.: 10/157,523

(22) Filed: May 29, 2002

(65) Prior Publication Data

US 2004/0208531 A1   Oct. 21, 2004

(51) Int. Cl.
*H01S 3/00*   (2006.01)
(52) U.S. Cl. ............................ 359/337.1; 359/337.11
(58) Field of Classification Search ............ 359/337.1, 359/337.11
See application file for complete search history.

(56) References Cited

U.S. PATENT DOCUMENTS

| | | | |
|---|---|---|---|
| 6,219,176 B1 | 4/2001 | Terahara | |
| 6,236,487 B1 | 5/2001 | Stephens | |
| 6,292,290 B1 | 9/2001 | Wan et al. | |
| 6,323,994 B1 | 11/2001 | Li et al. | |
| 6,621,621 B1 * | 9/2003 | Jones et al. | 359/337.11 |
| 6,731,424 B1 * | 5/2004 | Wu | 359/337.1 |
| 6,900,931 B1 * | 5/2005 | Sridhar et al. | 359/337.1 |

* cited by examiner

*Primary Examiner*—Mark Hellner

(57) ABSTRACT

A coordinated method is provided for controlling dynamic gain equalization in an optical transport network. The method includes: detecting a deviation in optical power of an optical signal traversing the optical transport network along a transmission path, adjusting spectral profile of the optical signal at a first network element in the optical transport network, where the first network element is located in the transmission path downstream from the origination point of the deviation; and adjusting spectral profile of the optical signal at a second network element subsequent to the adjustment at the first network element, where the second network element is located in the transmission path downstream from the origination point and the first network element.

49 Claims, 13 Drawing Sheets

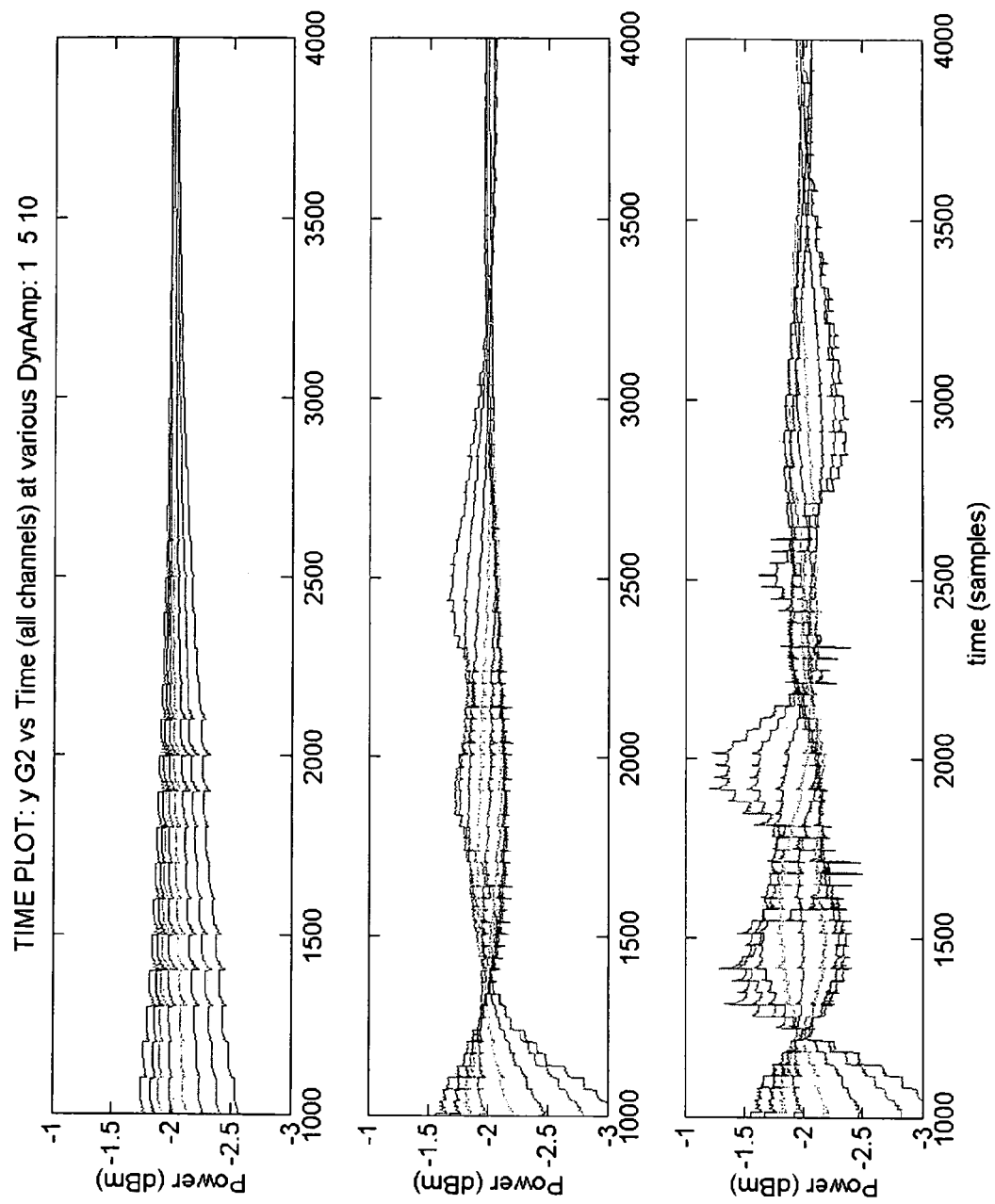

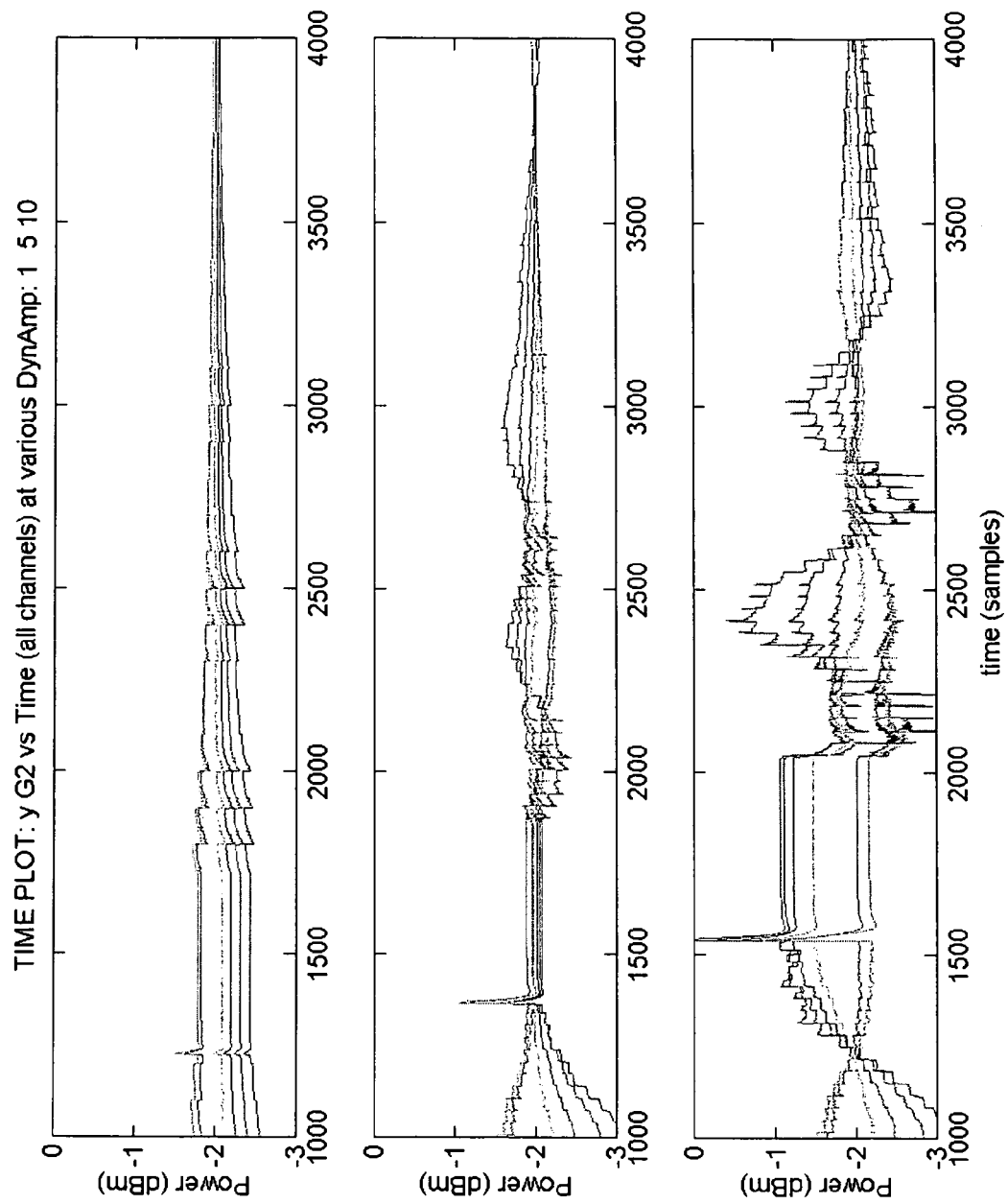

COORDINATED CONTROL OF DYNAMIC GAIN EQUALIZATION IN A WAVELENGTH DIVISION MULTIPLEXED OPTICAL SYSTEM

FIELD OF THE INVENTION

The present invention relates generally to dynamic gain equalization in an optical transport network and, more particularly, to a coordinated control scheme for implementing dynamic gain equalization in a wavelength division multiplexed optical network.

BACKGROUND OF THE INVENTION

Dense wavelength division multiplexed (DWDM) optical network systems multiplex many wavelengths on one fiber strand and have evolved to be able to support large wavelength counts (e.g., 160 wavelengths) on one fiber strand. Large wavelength counts forced the industry to minimize the spacing between wavelengths and trigger developments in the optical amplifier area, enabling the gain to be flattened so more of the optical spectrum could be used. Additionally, the L band, C band and other regions of this spectrum were defined, and typical solutions use separate amplifiers per band as a compromise between effective impairment compensation and economics.

Until recently, optical networking transport systems had a conventional optical reach up to 800 km. Optical-electrical-optical (OEO) conversions are needed, in the outside plant as regenerators, to extend the reach of these transport systems. OEO conversions also occur at transponders at the point of connection between the transport system and other systems (e.g., cross-connects, SONET multiplexers, etc.). First generation long haul (i.e., optical reach on the order of 500 to 1500 km) and ultra long haul (i.e., optical reach>1500 km) greatly reduce OEO conversions, allowing the transport payload to stay in the optical domain for much longer distances. Next generation transport systems can include photonic cross-connects to allow the wavelengths to be switched from one fiber to another while traveling long distances. Cross-connections can be done manually or via automated optical add-drop multiplexers (OADM) and photonic switches.

In a DWDM system, a group of optical channels (wavelengths) is launched onto a transmission fiber. Periodically, the wavelengths need to be amplified (typically every 80 to 120 Km) to overcome losses in the transmission fiber. This amplification is done using an all-optical amplification means such as an erbium doped fiber amplifier (EDFA). Network elements can also be deployed along the path, such as an optical add/drop multiplexer or a photonic cross-connect, that allow an optical channel to be dropped (terminated) at a local transponder, added (launched) from a local transponder, or photonically switched from one transmission fiber to another. A transponder typically performs an optical-electrical-optical (OEO) conversion function to convert a received WDM wavelength into a client signal (e.g., a SONET signal) and vice versa.

Maintaining the correct target output power per channel is important to the correct operations of a DWDM system. The individual channel power levels needs to be high enough to withstand the loss of optical power over an optical fiber section between the launch point and the next network element, to maintain as large an optical signal to noise ratio (OSNR) as possible. Network elements along the transmission path, such as EDFAs, induce impairments, which add noise to the signal. For example, EDFAs can produce amplifier spontaneous emission (ASE), which degrades the OSNR. If the power per channel becomes too low, the optical signal to noise ratio is decreased, and this may cause an increase in the error rate of the data recovered by the receiver, or perhaps a total loss of the received data. If the power per channel becomes too high, non-linear effects (such as self-phase modulation) may start to manifest themselves due to the behavior of the optical fiber, again causing data with errors at the receiver or a complete loss of the data. A margin has to be allocated for all of the various impairments that can occur along the transmission path of a channel. Proper control of the per-channel power level increases the margin available for other impairments, such as chromatic dispersion, polarization dependent losses, etc. Non-optimal per-channel power level control reduces the available margin for other impairments. Receiver errors occur when the allocated margin is not large enough for the various impairments.

An EDFA cannot control the power of wavelengths individually. Rather, only the overall (total) gain of the amplifier can be controlled. In addition, an EDFA typically produces a non-equal optical gain over a wide range of wavelengths (such as over the C-band or the L-band). EDFAs typically utilize gain flattening filters in order to even out the amplification gain across the amplification band, but there is usually a residual gain inequality (gain tilt) across the amplification band.

DWDM systems may also deploy distributed RAMAN amplification techniques to produce amplification with improved OSNR. RAMAN amplification causes "gain ripples" across the amplification band, i.e., not every optical channel receives exactly the same RAMAN amplification gain.

Other elements along the optical path may also affect the optical power of optical channels in a non-equal manner. For example, optical switching technologies such as one-dimensional MEMS devices, two-dimensional MEMS devices, three-dimensional MEMS devices, and liquid crystal wavelength selective devices can cause non-equal losses of optical power as optical channels are switched from one transmission fiber to another. This is in addition to any tilt that already existed among the channels as they arrive at the optical switch from the various transmission fibers.

Consequently, the target launch power profile of a group of optical channels launched into an optical fiber will move away from the optimal power levels along the optical transmission path. To overcome this, optical channel power level adjustment devices, such as a dynamic gain equalizer (DGEQ), can be deployed at various points in the network to help return the spectral power profile across the transmission band back towards the desired profile. Such devices may be able to adjust the power level of each optical channel individually, or may be able to adjust small groups of channels (e.g. a group of 2 or 4 adjacent channels), or on a sub-channel basis (i.e. adjusting the spectral profile within a channel).

For example, imagine a simple linear chain of amplifiers spaced on average 100 km apart (typical spacing in long haul or ultra-long haul networks). Over a 4000 km optical transmission distance, this would represent approximately 40 amplifiers sites in the transmission path. Spectral control capability (e.g. DGEQ) may be placed, for example, at every second or at every fourth amplifier site, thereby resulting in 10 or 20 spectral control apparatus in the transmission path.

If an event were to happen in the network at or near the beginning of the transmission path, such as an amplifier suddenly causing an abnormal gain tilt (which is a possible failure mode of an EDFA), all the network elements with spectral control capability downstream of that point will want to compensate for the gain tilt.

In an independent control approach, each DGEQ is adjusted independently. In this approach, various control elements may be making the same adjustment in parallel and thus may be conflicting with each other. For example, assume that the power level of channel 1 is too high and has to be brought down. In the independent control approach, many network elements may see that the power level of channel 1 is too high, and in parallel may reduce the power level of this channel (e.g. via a DGEQ). Since the power level is being reduced in parallel, this will make the power level of channel number 1 become lower than the target along the path. Next, the power level will have to be increased, such that the power level may be over-compensated. Using this approach will cause some undershoots and overshoots until the correct steady state condition is reached. The overshoots and undershoots can persist for tens of seconds depending on the update rate of the DGEQ.

Therefore, it is desirable to provide a coordinated method for controlling dynamic gain equalization in an optical transport network.

SUMMARY OF THE INVENTION

In accordance with the present invention, a coordinated method is provided for controlling dynamic gain equalization in an optical transport network. The method includes: detecting a deviation in optical power of an optical signal traversing the optical transport network along a transmission path, adjusting spectral profile of the optical signal at a first network element in the optical transport network, where the first network element is located in the transmission path downstream from the origination point of the deviation; and adjusting spectral profile of the optical signal at a second network element subsequent to the adjustment at the first network element, where the second network element is located in the transmission path downstream from the origination point and the first network element.

For a more complete understanding of the invention, its objects and advantages, reference may be had to the following specification and to the accompanying drawings.

BRIEF DESCRIPTION OF THE DRAWINGS

FIGS. 3A–3C are plots illustrating simulation results for a conventional non-coordinated approach for controlling dynamic gain equalization;

FIGS. 5A–5C are plots illustrating additional simulation results for a conventional non-coordinated approach for controlling dynamic gain equalization;

DETAILED DESCRIPTION OF THE PREFERRED EMBODIMENTS

Figure 1:
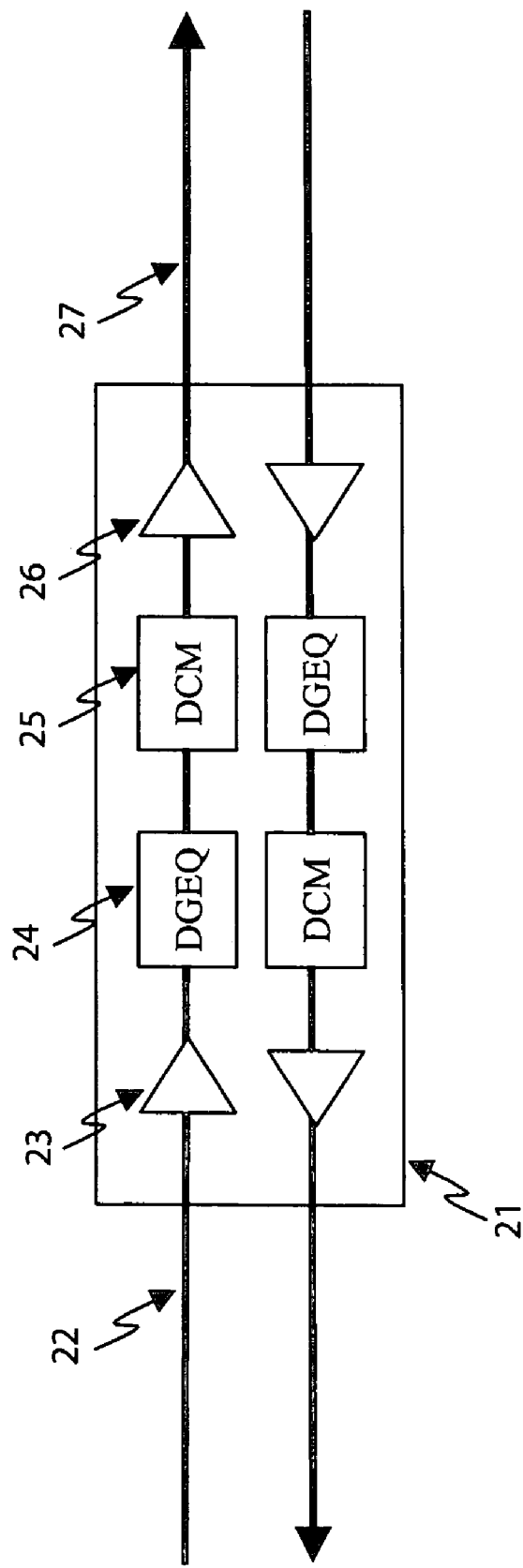
FIG. 1 is a block diagram depicting an exemplary dynamic amplifier site having at least one dynamic gain equalizer.

FIG. 1 illustrates an exemplary dynamic amplifier site 21. The dynamic amplifier site 21 may include optical amplification elements, dynamic gain equalizer elements and dispersion compensation elements. While the following description is provided with reference to a particular configuration, it is readily understood that other network components and/or other configurations are within the scope of the present invention.

In operation, the dynamic amplifier site 21 receives a wavelength division multiplexed optical signal on a receive fiber 22. An optical amplification element, such as an erbium-doped fiber amplifier (EDFA) 23, amplifies the WDM optical signal to overcome the losses of the preceding optical fiber span. A dynamic gain equalizer (DGEQ) 24 provides the ability to adjust the spectral profile of the WDM signal to a desired target spectral profile as is well known in the art. This adjustment may occur on a per channel (wavelength) basis or on a more coarse basis, such as on a group of adjacent channels, or on a sub-channel basis (i.e. adjusting the spectral profile within a channel). A dispersion compensation module (DCM) 25 compensates for the chromatic dispersion introduced by the optical transmission fiber. Another optical amplification element 26 then amplifies the WDM optical signal to overcome the losses introduced by the DGEQ 24 and the DCM 25 to achieve the correct power level before the WDM optical signal is launched onto the transmit fiber 27. A similar component configuration is provided for the other transmission direction (right to left in the figure), and thus is not described above.

Figure 2A:
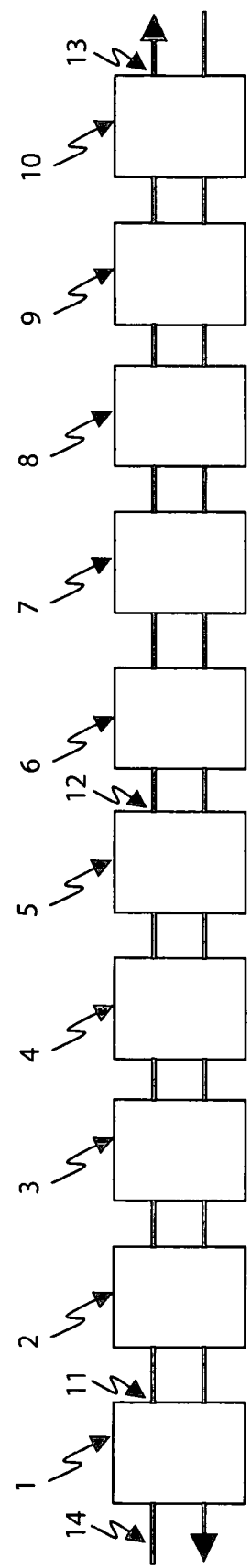
FIG. 2A is a block diagram depicting an exemplary transmission path in an optical transport network.

FIG. 2A shows an exemplary portion of a transmission path in an optical transport network. The transmission path includes ten (10) dynamic amplifier sites as described above. The dynamic amplifier sites are designated (from left to right) as follows: a first dynamic amplifier site 1, a second dynamic amplifier site 2, a third dynamic amplifier site 3, a fourth dynamic amplifier site 4, a fifth dynamic amplifier site 5, a sixth dynamic amplifier site 6, a seventh dynamic amplifier site 7, an eighth dynamic amplifier site 8, a ninth dynamic amplifier site 9, and a tenth dynamic amplifier site 10. Although each amplifier site may be configured as described above, at a minimum, each amplifier site includes at least one dynamic gain equalizer for each transmission direction.

Figure 2B:
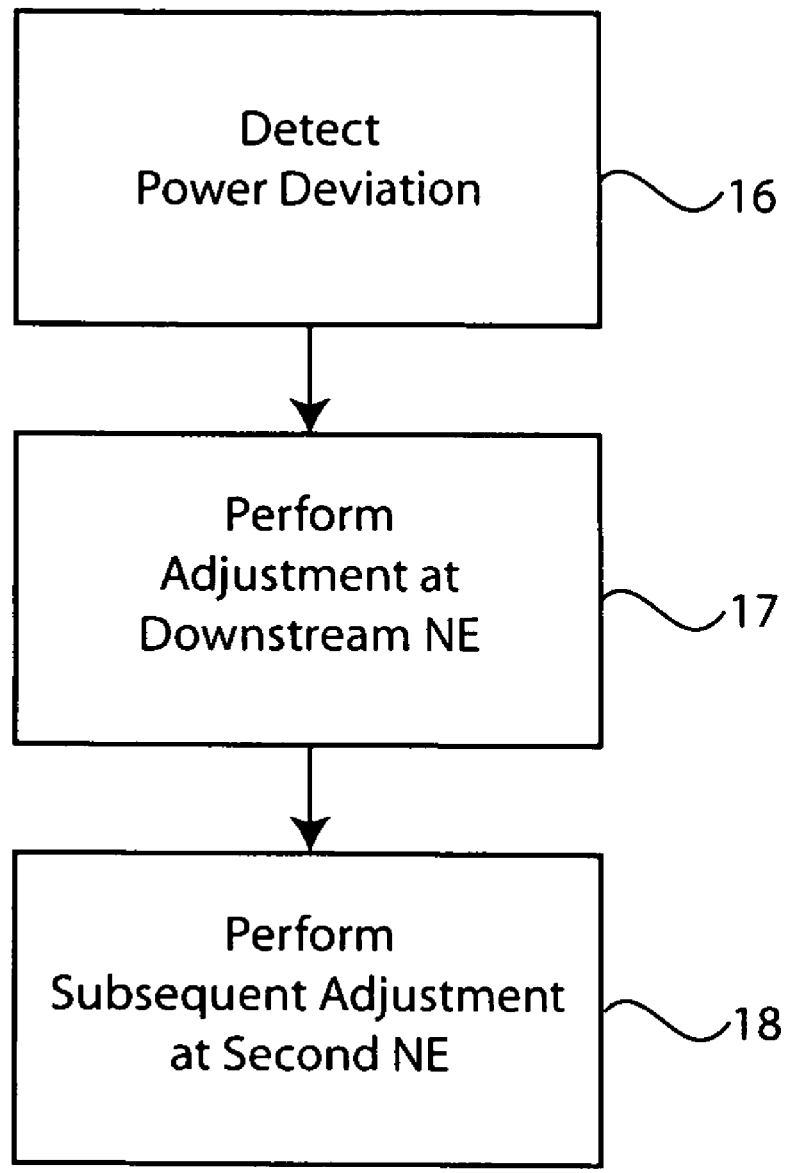
FIG. 2B is a flowchart illustrating a coordinated method for controlling dynamic gain equalization in an optical transport network in accordance with the present invention.

In accordance with the present invention, a coordinated method is employed for controlling dynamic gain equalization along the transmission path of an optical transport network as shown in FIG. 2B. First, a deviation in optical power is detected at step 16 as an optical signal traverses the transmission path of the optical transport network. In the coordinated approach, the spectral profile of the optical signal is adjusted at step 17 by only one dynamic amplifier in the transmission path. In particular, the spectral profile is adjusted at a dynamic amplifier located immediately downstream from the origination point at which the deviation occurred in the transmission path. Subsequent to this first adjustment, the spectral profile of the optical signal may be further adjusted at a second dynamic amplifier site as shown at step 18, where the second dynamic amplifier site is located downstream from the origination point and the first dynamic amplifier site.

When a dynamic amplifier site is performing a spectral profile adjustment operation, any dynamic amplifier site located downstream of it should not be performing a spectral profile adjustment. If a downstream dynamic amplifier site wants to perform a spectral profile adjustment, it waits for its turn, i.e. it should wait until no other dynamic amplifier sites located upstream of it are performing a spectral profile adjustment. If a dynamic amplifier site is performing a spectral profile adjustment, and a different dynamic amplifier site located upstream of it starts to perform an adjustment, then the downstream dynamic amplifier site currently performing the adjustment stops and waits until there are no such adjustments occurring upstream. In this way, only one dynamic amplifier site in the transmission path is performing a spectral profile adjustment at a given time. This approach causes fewer undershoots and overshoots in the channel power levels along the transmission path.

Simulations were performed to compare the conventional independent control approach to the coordinated control approach of the present invention. The independent control approach (also referred to as the non-coordinated approach) means an approach where each DGEQ is run independently from the other DGEQs, such that more than one spectral adjustment occurs concurrently in time along the path of an optical channel. The simulation results illustrate the results for a single transmission direction. Since two directions of transmission are independent, the results are applicable to transmission in either direction. Simulation results are further described below.

The focus of the simulations is to demonstrate the results of different control approaches as applied to the transmission path shown in FIG. 2A. For demonstration purposes, assume a dynamic amplifier site is disposed at every fourth amplification site along the transmission path with each span being 100 km. The spacing of dynamic amplifier sites affects the amount of propagation delay between the sites. In this case, the propagation delay between dynamic amplifier sites is approximately 2000 microseconds. The three intervening amplifier sites are line amplifiers, which do not include a DGEQ element, and therefore do not participate in the spectral adjustment of an optical signal. The intervening line amplifiers, however, would introduce further impairments to the target spectral profile, such as further gain tilt from the additional EDFAs and RAMANs, which the DGEQ in the downstream dynamic amplifier site would have to adjust for. Since the DGEQ adjustment time is large compared to the propagation delay time, the propagation delay between dynamic amplifier sites does not significantly change the results of the simulation. It is readily understood that the spacing between dynamic amplifier sites may vary, for example, every other amplification site, based on factors such as the type of optical fiber deployed in the network.

The simulations further assume that the transmission path supports 80 wavelengths in the transmission band (e.g., either the L or C transmission band). The plots shown in the simulation results show the variation of power per channel versus time for several wavelength channels on the same graph. Note that only one sample wavelength is shown from each group of 10 consecutive wavelengths. Thus, the simulation results show eight sample wavelengths spaced evenly among the group of 80 wavelengths in the transmission band. The target launch power per channel at the output of each dynamic amplifier site is −2 dBm.

Figures 4A, 4B, 4C:
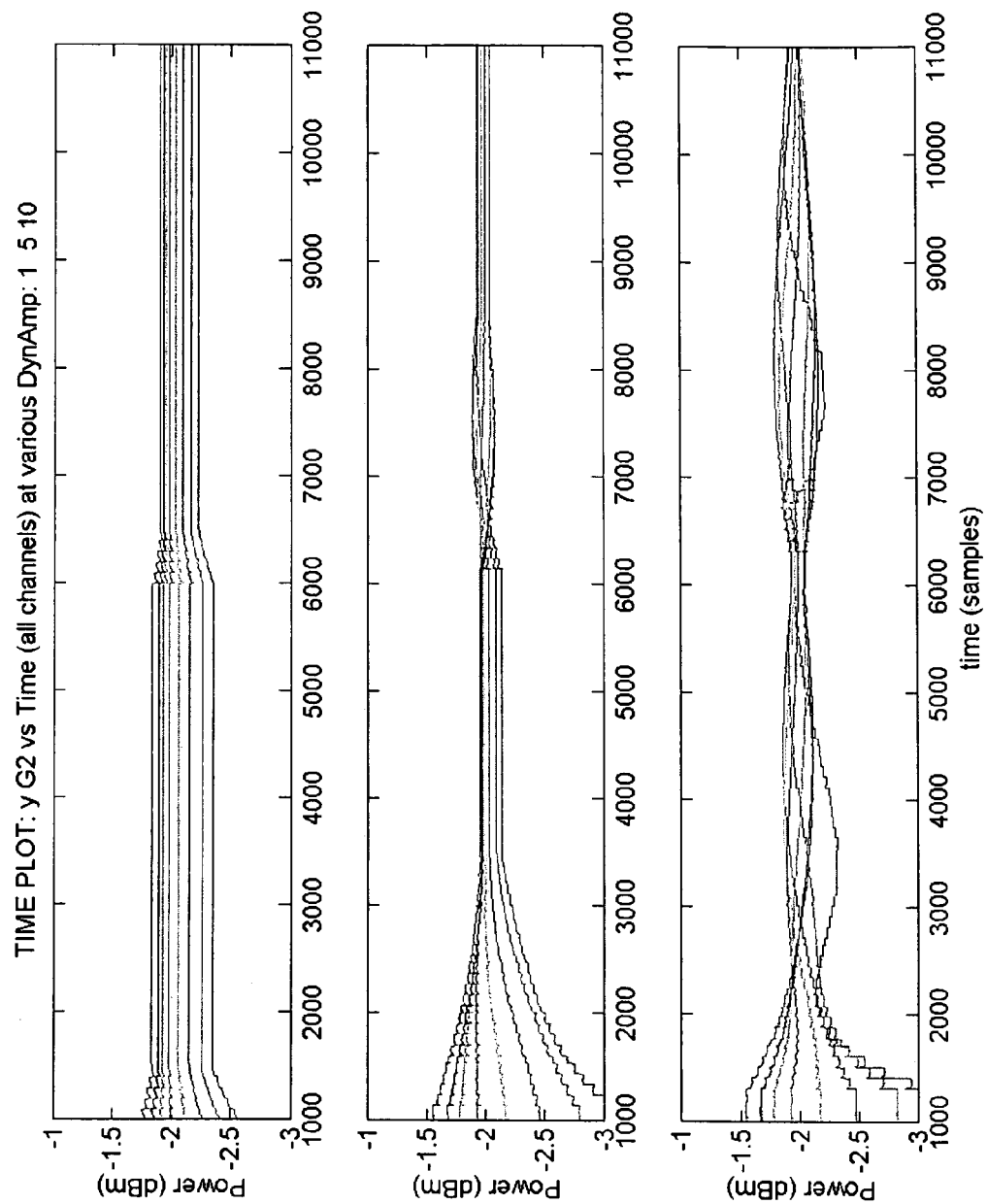
FIGS. 4A–4C are plots illustrating simulation results for the coordinated control method of the present invention.

FIGS. 3A–3C shows simulation results for the non-coordinated control approach; whereas FIGS. 4A–4C shows simulation results for the coordinated control approach. FIGS. 3A and 4A illustrates the output power per channel (for 8 channels spread equally across the 80 channel L-band transmission band) at an output point 11 of first dynamic amplifier 1 (as shown in FIG. 2A). Note that the band is actively carrying 80 channels, but only a sample of 8 channels is plotted in the simulation results. Similarly, FIGS. 3B and 4B illustrate the output power per channel (for 8 channels spread equally across the 80 channel L-band transmission band) at an output point 12 of the fifth dynamic amplifier 5 (as shown in FIG. 2A), and FIGS. 3C and 4C illustrate the output power per channel (for 8 channels spread equally across the 80 channel L-band transmission band) at an output point 13 of the tenth dynamic amplifier 10 (as shown in FIG. 2A).

In each graph, the time axis is in units of 10 microseconds. For example, the elapsed time between 1000 and 2000 on the x-axis represents 10 milliseconds (i.e., (2000−1000)*10 microseconds). The simulation was run with a DGEQ update time of 1 millisecond per update cycle (e.g., the DGEQ performs a spectral adjustment step once every 1 milliseconds). In an actual system, the DGEQ performance is much slower. For example, a typical DGEQ update time is once per second. The results shown by the simulation can be scaled to account for different DGEQ update times. For a DGEQ update time of once per second, the x-axis on the graph would represent units of 10 milliseconds instead of 10 microseconds, and 1000 units on the x-axis would represent 10 seconds instead of 10 milliseconds.

Referring to FIGS. 3A–3C, the graphs show a sample starting condition as seen at the output of the first, fifth, and tenth dynamic amplifier sites. At the starting point (i.e., shown as 1000 on the x-axis), the output power spectrum of the first dynamic amplifier has a tilt among its 80 channels of approximately 0.75 dB. In addition, the output power spectrum of the fifth dynamic amplifier has a tilt of approximately 1.5 dB, and output power spectrum of the tenth amplifier has a tilt of approximately 2.5 dB.

FIG. 3A shows that the first dynamic amplifier output smoothly moves the wavelengths towards their target output power of −2 dBm. In contrast, the channel output powers of the fifth dynamic amplifier have some undershoots and overshoots on the way towards the target value as shown in FIG. 3B, and channel output power of the tenth dynamic amplifier has more pronounced power undershoots and overshoots before reaching the target power levels as shown in FIG. 3C. For example, at the output of the tenth dynamic amplifier, one of the wavelengths at time 1000 started at over 1 dBm below the target power level of −2 dBm. Near time 1400 and then again near time 2000, this wavelength has overshot the target power level by around 0.75 dBm, representing a peak to peak excursion of over 1.75 dBm. At around time 3200, the wavelengths are all within +/−0.25 dBm from the target power level. At a DGEQ update time of once a second, this represents an elapsed time of 22 seconds (recalling that the simulation started at time 1000, not zero).

The undershoots and overshoots are due to the fact that at a given moment in time, each DGEQ is reacting to what it sees at its input. However, at the same time, upstream DGEQs are also modifying their outputs in response to their input conditions, which changes the input conditions seen by the downstream dynamic amplifier sites.

Referring to FIGS. 4A–4C, the DGEQ adjustments are done sequentially along the chain of dynamic amplifier sites. In particular, each dynamic amplifier performs 5 DGEQ adjustment iterations and then stops to allow the next downstream DGEQ to perform an adjustment cycle. Once all dynamic amplifiers along the chain have finished an adjustment cycle, then the chain of dynamic amplifiers perform another set of sequential adjustments.

It can be seen that coordinated approach results in per-channel power levels having less undershoots and overshoots than the non-coordinated approach. For example, at time 2000, all wavelengths at the output of the tenth dynamic amplifier are within +/−0.25 dBm of the target output power per channel as shown in FIG. 4C. Between time 3000 and 4000, one of the wavelengths undershoots slightly, deviating around 0.3 dBm from the target launch power. Although there is a bit more overshoot and undershoot between time 7000 and 9000, all of the wavelengths stay within +/−0.25 dBm of the target launch power. Finally, from time 4000 onwards, all of the wavelengths stay within +/−0.25 dBm of the target launch power. Note that it takes longer to reach the target spectral profile, but the per-channel power levels are maintained closer to the target during the adjustment period. The degree of overshoots and undershoots are less severe.

A second simulation was performed along the same transmission path. The second simulation has the same initial equalization tilt among the 80 channels at the starting time. Likewise, the DGEQs start to perform spectral adjustments as in the first simulation. However, at approximately time 1250, there is a sudden drop of 30% of the channels (24 channels out of the 80) at input 14 to the first dynamic amplifier 1. This simulation represents a fault in the network involving a subset of the total channels.

FIGS. 5A–5C show simulation results for the non-coordinated control approach. Specifically, FIGS. 5A, 5B and 5C show the variations in the per-channel powers (for the surviving channels) as seen at the outputs of the first, fifth and tenth dynamic amplifier sites, respectively. As in the first simulation, the DGEQs are operating in parallel to adjust the output power levels of the channels to the target value of −2 dBm. At around time 1250, a perturbation in the output power of the channels can be seen as the EDFAs react to the sudden drop of 30% of the channels. At the output of the tenth dynamic amplifier 10, the perturbation can be seen at around time 1600. The difference between the two points of time represents the propagation delay of approximately 3.2 milliseconds which is represented by 320 time units on the graph.

Figure 6A:
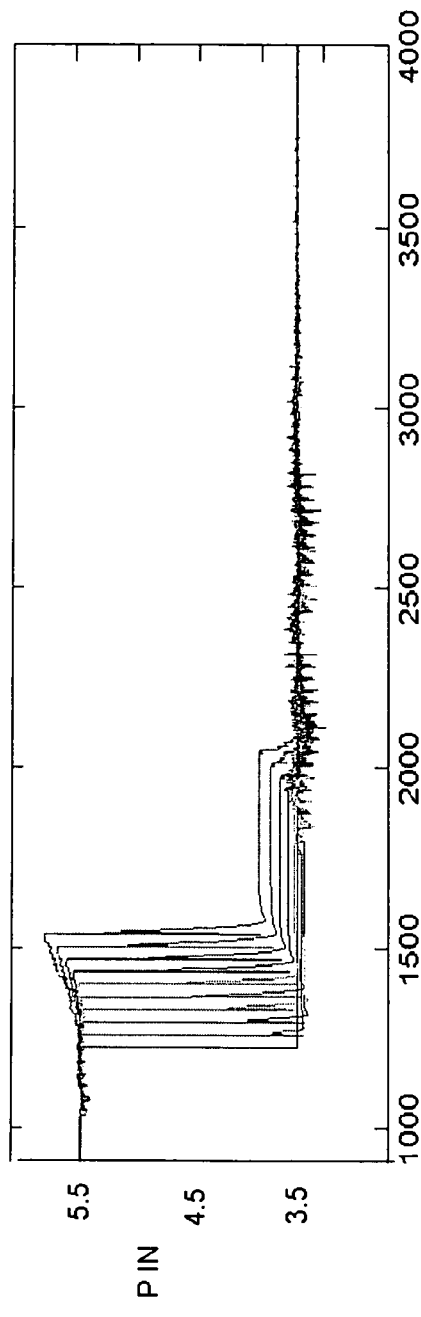
FIGS. 6A and 6B are plots illustrating total input power and total output power, respectively, at each of the dynamic amplifier sites along the transmission path during the simulation of the non-coordinated control approach.
Figure 6B:
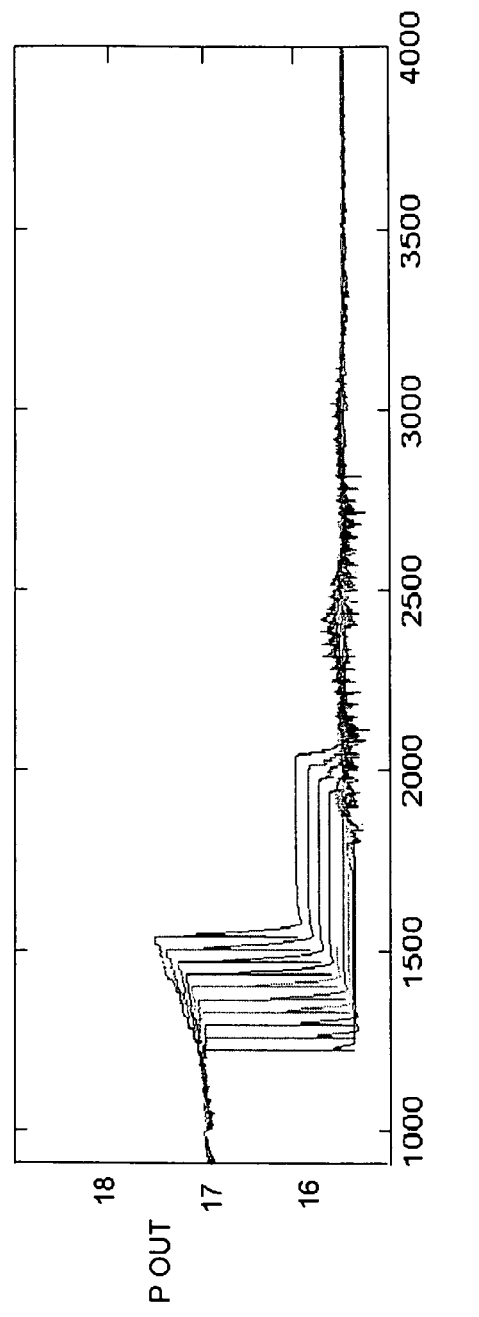

In FIG. 5C, it can be seen that significant overshoots and undershoots occurs at the output of the tenth dynamic amplifier 10. For example, at around time 2400, there is an overshoot of around 1.5 dBm above the target power level of −2 dBm. At around time 2200 and 2700, there is undershoot of around 1 dBm below the target power level. Beyond time 3100, the channels are kept within +/−0.25 dBm of the target power level. FIGS. 6A and 6B illustrate the total input power and total output power, respectively, of the ten dynamic amplifier sites. In FIG. 6B, the total output power target of 17 dBm (for 80 channels) changes to 15.5 dBm (for 56 channels). This illustrates the EDFA transient response to the sudden drop of 30% of the channels.

Figures 7A, 7B, 7C:
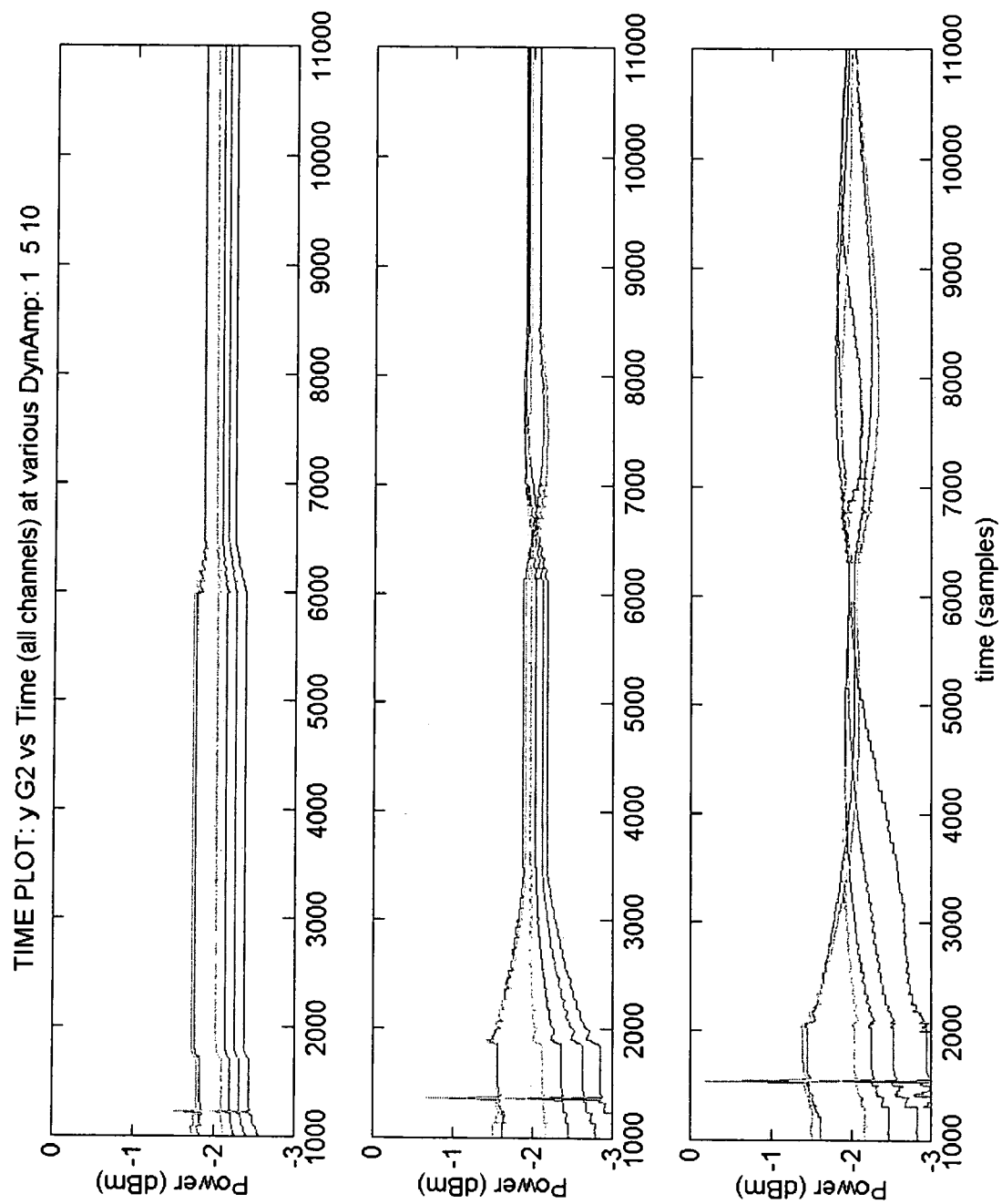
FIGS. 7A–7C are plots illustrating additional simulation results for the coordinated control method of the present invention.
Figure 8A:
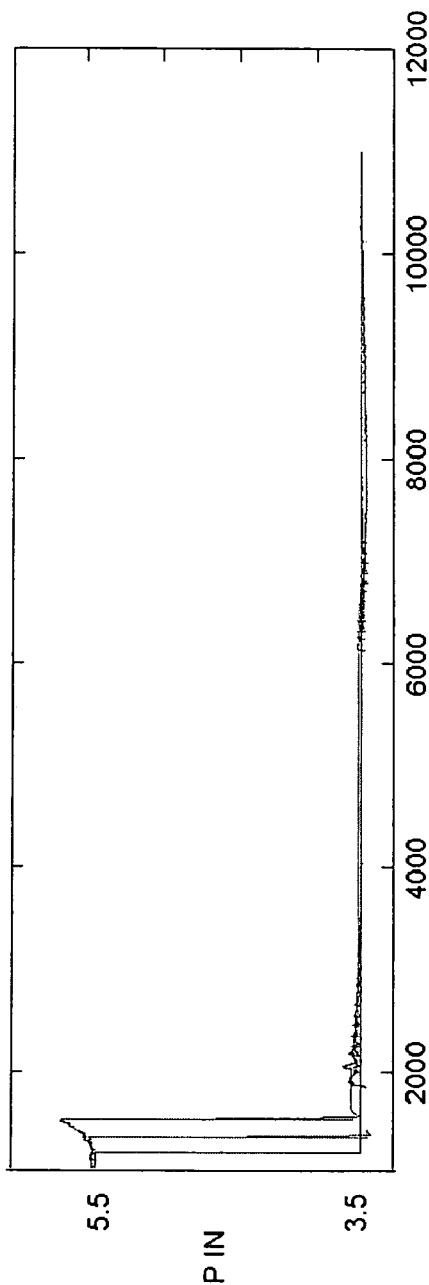
FIGS. 8A and 8B are plots illustrating total input power and total output power, respectively, at each of the dynamic amplifier sites along the transmission path during the simulation of the coordinated control approach.
Figure 8B:
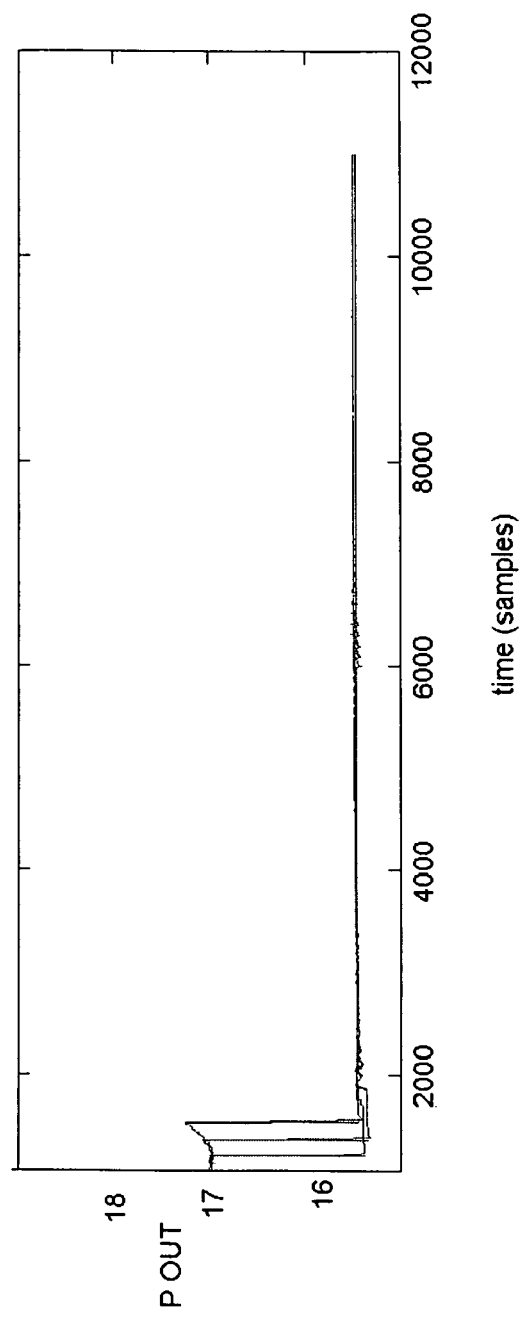

In contrast, FIGS. 7A–7C show simulation results for the coordinated control approach. After around time 3500, all channels at the output of tenth dynamic amplifier 10 are maintained within +/−0.25 dBm of the target output power per channel of −2 dBm. Again, the coordinated control approach yields very low overshoots and undershoots, i.e., the per channel power moves towards the target power level in a smoother, but slower, fashion. Although the DGEQs in the coordinated case operate for a longer time period, the total elapsed time is only a bit longer than the non-coordinated control approach. FIGS. 8A and 8B shows the total input power and total output power, respectively, of the ten dynamic amplifier sites for the coordinated control approach. In sum, the simulation results illustrate the advantages of the coordinated control approach over the non-coordinated control approach.

A more detailed protocol for implementing the coordinated control approach of the present invention is further described below. In general, DGEQ adjustment information is communicated from one network element to the next network element along a transmission path. The DGEQ adjustment information is preferably propagated from one network element to the next network element using a wayside communication subsystem. In a preferred embodiment, the adjustment information is communicated using an aggregate protocol message that contains information about one or more of the optical data channels traversing the path. It is envisioned that messaging could also be done on a per channel basis, i.e., adjustment information for each data channel is sent using a different protocol message. In either case, the adjustment information is communicated using an optical supervisory channel that is integrated into the optical transport network as is well known in the art. However, it is envisioned that other types of wayside communication subsystem may also be used to interconnect the network elements in a given transmission path. For instance, a disjoint overlay data network may be suitably used to provide wayside communication for the optical transport network.

The coordinated control protocol is based on a forward adjustment messaging scheme. A preferred message format includes an upstream adjustment indicator, a local adjustment indicator, and a channel dependency list. The upstream adjustment indicator indicates whether there is an upstream adjustment. If there is no upstream adjustment, then the remainder of the message is not formatted. If there is an upstream adjustment, then the local adjustment indicator indicates whether the adjustment is occurring on the local optical multiplex section (OMS) or further upstream than the local optical multiplex section. In the case of an upstream adjustment, it is envisioned that other information, such as the set of channels being adjusted, may also be provided by the forward adjustment message.

The coordinated scheduling of spectral profile adjustments occurs as follows. When a dynamic amplifier site receives a forward adjustment message that indicates there is no upstream adjustment, then it may perform a spectral profile adjustment. When the dynamic amplifier site performs such an adjustment, it sends a forward adjustment message that indicates an adjustment operation is in progress. The forward adjustment message is propagated downstream in a hop-by-hop fashion to each network element in the transmission path.

When the dynamic amplifier site performing the spectral profile adjustment is finished, it changes the forward adjustment message to indicate that there is no upstream adjustment. This allows the next downstream dynamic amplifier site a chance to make an adjustment, if necessary. If the next dynamic amplifier site wants to perform a spectral profile adjustment, it continues to send a forward adjustment message (including updated information) indicating an upstream adjustment in the downstream direction, and then performs an adjustment; otherwise, it sends a forward adjustment message indicating no upstream adjustment.

Multiple dynamic amplifier sites may be performing spectral profile adjustments in parallel so long as there is no dependency between them. In one embodiment, dependency is based on the number of active data channels shared by the optical signal traversing through two given optical multiplex sections. If the number of active data channels embodied in the optical signal exceeds a predetermined threshold, then the two amplifier sites are considered dependent. For example, optical multiplex sections sharing even a single active channel may be deemed dependent on each other. Alternatively, if only a single data channel was routed from one optical multiplex section to another optical multiplex section, there may be no dependency between the sections since the channel count is too low. It is readily understood that the two transmission directions associated with a dynamic amplifier site are independent. To the extent that the optical network supports two transmission bands (such as the L-band and the C-band), it is further understood that each band are independent for purposes of the present invention.

Figure 9:
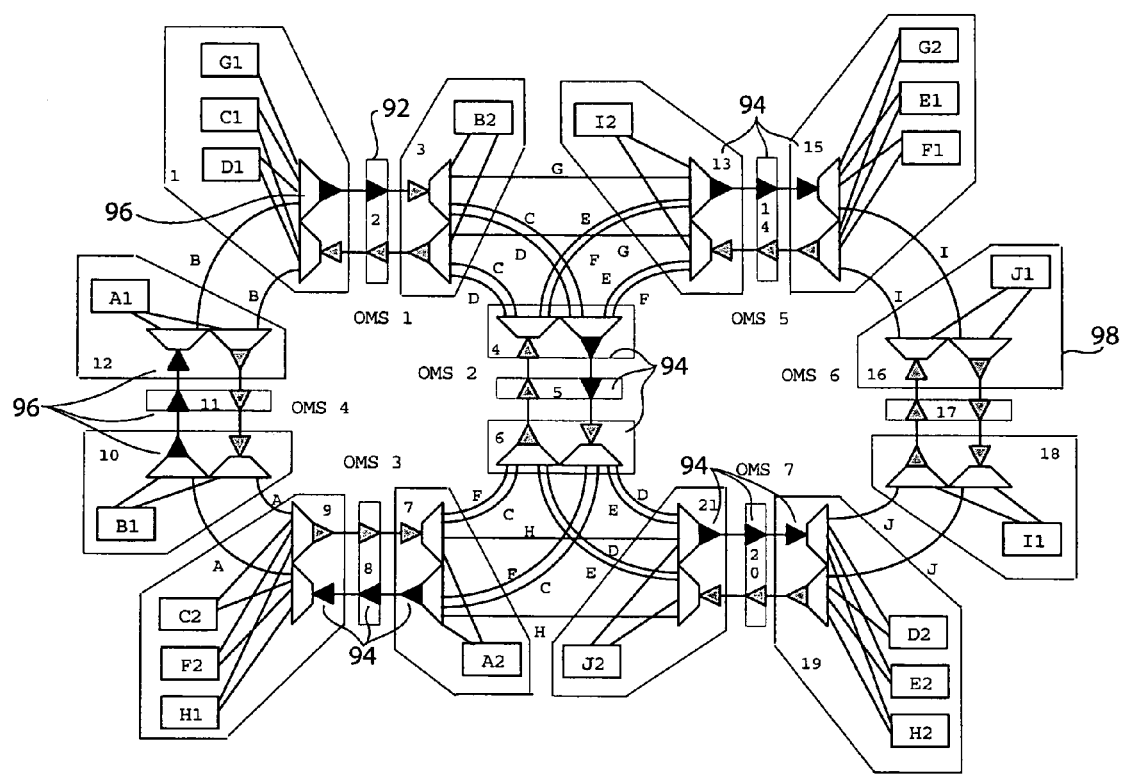
FIGS. 9 and 10 are block diagrams of exemplary optical network configurations having at least one looped transmission path.

FIG. 9 illustrates how dependencies between dynamic amplifier sites may be defined in an exemplary optical transport network. A network element designated at 92 is performing a spectral profile adjustment in one direction (east). In this example, dynamic amplifier sites that are downstream of the adjustment point are designated 94, and dynamic amplifier sites that are upstream of the adjustment point are designated 96. The remaining dynamic amplifier sites have no dependency on the current adjustment location. In other words, the dynamic amplifier site designated at 98 may be performing an adjustment in either direction contemporaneously with the dynamic amplifier site designated at 92.

As noted above, dependency is based on the routing of channels (through sub-band routing or individual channel routing) from one optical multiplex section to another. For instance, the amplifier sites in OMS 5 are dependent on those in OMS 1 due to the routing of channels in sub-band G from OMS 1 to OMS 5; whereas, the amplifier sites in OMS 2 are dependent on those in OMS 1 due to the routing of channels in sub-bands C and D. Similarly, the amplifier sites in OMS 3 are dependent due to sub-band C and the amplifier sites in OMS 7 are dependent due to sub-band D.

Only the current adjustment location is used to determine the downstream optical multiplex sections. Once the adjustment point moves downstream to Network Element (NE) 4 and NE 13, then there is a new set of downstream amplifier sites. For example, once NE 13 is performing a spectral profile adjustment, then the amplifier sites along OMS 6 are now downstream of the adjustment point. Consequently, any particular amplifier site could suddenly become downstream of an adjustment point as multiple adjustment points are moving about the network. This is a result of allowing multiple adjustment points to exist at once, which is a requirement in any reasonably sized network. When they interfere with each other, multiple adjustment points must be resolved as will be further described below.

To enhance the coordinated control protocol, the forward adjustment message further includes a channel dependency list. The channel dependency list is a list of the channels that are being adjusted along with an assigned priority of the adjustment. The channel dependency list serves two purposes. First, it provides a list of the channels that are being adjusted upstream. Since the routing of the adjustment dependencies is done on a per optical channel basis, this information is needed to route the dependency downstream along the network. For example, assuming amplifier site designated at 92 is performing a spectral profile adjustment, such that all active channels in the band are affected, as shown in FIG. 9. When a forward adjustment message indicating an upstream adjustment is propagated along OMS 5, only the set of active channels in sub-band G appear in the dependency list. Since none of the channels in the dependency list are routed from OMS 5 to OMS 6, the forward adjustment message indicating an upstream adjustment is not propagated to OMS 6.

Second, the channel dependency list provides an indication of the "priority" of the upstream adjustment. It is envisioned that the priority information could take a number of forms. One form is to base the priority simply on some unique NE identifier. For example, each network element in the network could be assigned a unique NE identifier. This could simply be a unique number (such as a 32-bit number), or it could be another form of unique identifier that also serves another purpose in the network, such as a unique IP address.

It is envisioned that the channel dependency list information may be encoded in a forward adjustment message in a number of ways. For example, assume that an optical multiplex section carries 16 channels, identified as channels 1 through 16. Assume that a forward adjustment message needs to be sent along an optical multiplex section, indicating that channels 1, 4, and 7 are being adjusted upstream with a priority of 1000, and channels 2, 3 and 16 are being adjusted upstream with a priority of 2000. In one form, the priority information is encoded in an array, one entry per channel in the OMS. A special priority value (such as zero) would indicate that the channel is not being adjusted upstream. This would make the channel dependency list a fixed size, regardless of the number of channels affected. In this form, the 16 channels in the channel dependency list would be encoded as an array of 16 priority values as follows: (1000, 2000, 2000, 1000, 0, 0, 1000, 0, 0, 0, 0, 0, 0, 0, 0, 2000), where priority zero indicates that the channel is not being adjusted upstream (i.e. not dependent). In an alternative form, the priority information may be encoded as a variable length list of channels being affected. For each affected channel in the list, the channel identifier would be given, along with the priority of the adjustment, as follows: (1, 1000), (2, 2000), (3, 2000), (4, 1000), (7, 1000), (16, 1000). Since an upstream adjustment affects many channels at once (with a common adjustment priority), and many channels may be routed together from one OMS to another, a more compact form could also be used. In this form, the priority information is encoded as a variable length list, with each entry in the list first gives the list of affected channels, followed by a common adjustment priority, as follows: ((1, 4, 7), 1000), ((2, 3, 16), 2000). As will be further described below, this information is used to resolve multiple simultaneous adjustment points that are dependent on each other.

Resolving multiple simultaneous adjustment points that are dependent on each other may require an arbitration scheme. Consider the network shown in FIG. 10. Suppose that NE 4, NE 11, NE 18 and NE 25 designated as 110, 112, 114 and 116, respectively, all decide simultaneously to perform a spectral profile adjustment in the same direction (e.g. in the clockwise direction around the loop). In this example, each of the four network elements sees that an adjustment is occurring upstream. One way to resolve this contention is for all four network elements to terminate its adjustment operation and to back off for a random amount of time before trying again. Under this approach, the first network element to try again will block any downstream network elements. One disadvantage of this approach is that for a short period of time none of the network elements are doing an adjustment (during the random back-off period).

Figure 11:
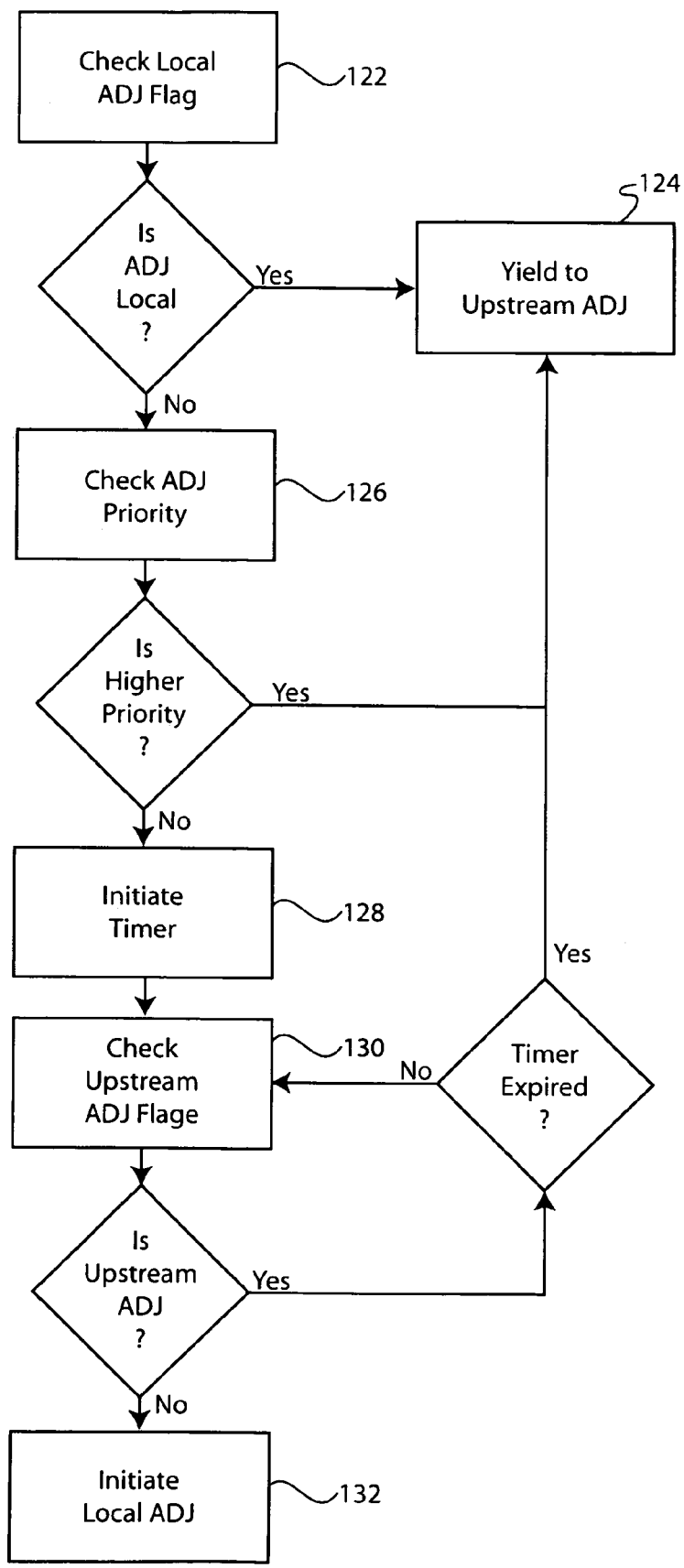
FIG. 11 is a flowchart illustrating an arbitration scheme resolving multiple simultaneous adjustment points in accordance with the present invention.

A preferred scheme for electing amongst multiple simultaneous adjustment points is illustrated in FIG. 11. Assume a given amplifier site opts to perform a spectral profile adjustment contemporaneously with receiving a forward adjustment message which indicates an upstream adjustment is in progress. First, the amplifier site checks the local adjustment indicator in the forward adjustment message at step 122. If the indicator indicates that the adjustment is occurring on the local optical multiplex section, the amplifier site immediately yields to this upstream adjustment as shown at step 124. On the other hand, if the indicator indicates that the adjustment is occurring further upstream than the local optical multiplex section, then the amplifier site checks the priority information associated with the upstream adjustment at step 126.

If the adjustment priority encoded in the channel dependency list is higher than the adjustment priority associated with the local adjustment request, then the amplifier site immediately yields to this upstream adjustment as shown at step 124. Since the channel dependency list may contain multiple adjustment priority values, the largest of such values is compared to the local adjustment priority. Alternatively, a metric may be derived from the multiple adjustment priority values. For example, the priority values may be summed together. In this example, the aggregate value may be used to determine the higher priority adjustment. If the aggregate values are equal, then a unique NE identifier may be used to determine the higher priority adjustment.

If the adjustment priority encoded in the channel dependency list is lower than the adjustment priority associated with the local adjustment request, then the amplifier site initiates a short timer at step 128. Since multiple adjustment request may occur simultaneously, the timer provides an opportunity for an upstream amplifier site to yield to the higher priority adjustment downstream. During the delay period, the local amplifier site checks the upstream adjustment indicator of incoming forward adjustment messages as shown at step 130. When the indicator indicates that there is no upstream adjustment, the local amplifier site may then initiate a local adjustment operation as shown at step 132. If the timer expires without a change in the upstream adjustment indicator, then the local amplifier yields to the upstream adjustment. Although this arbitration scheme is presently preferred, it is readily understood that other arbitration schemes may be employed and thus fall within the broader aspects of the present invention.

The coordinated control protocol may be further enhanced as follows. The protocol may optionally limit how long a given DGEQ is allowed to adjust before the network element lets the next downstream element perform a spectral profile adjustment. This limit could be based the residual power adjustment level being small enough (i.e., the delta of the current channel power levels vs. the target levels is below a threshold), and/or on a number of adjustment iterations, and/or on an elapsed time spent adjusting. When the limit is reached, the current adjusting network element can stop its adjustments, or can continue to adjust in parallel with the next network element. With the parallel approach (i.e., finish adjusting upstream while allowing the next network element starts adjusting), the assumption is that the residual adjustments left are very small and that they can be allowed in parallel with the downstream network element. Alternatively, the network element can stop its adjustments, allowing downstream network elements to have their turn and then resume adjustments at a later time (which would stop any downstream adjustments at that time).

Furthermore, a network element can optionally use local criteria to decide to adjust its DGEQ without waiting for its turn. For example, if the channel power levels are too far away from the target, the network element may want to bring the channels closer to their targets. In addition, an optional timer can be used to detect if the coordinated control protocol is not functioning properly (or if a network element is having to wait too long for its turn to adjust), and if so, a network element can make a decision to adjust its DGEQ without having coordinated with other network elements. Also, this decision can be triggered by an indication of a failure of the signalling channel over which the coordination protocol runs.

Figure 12:
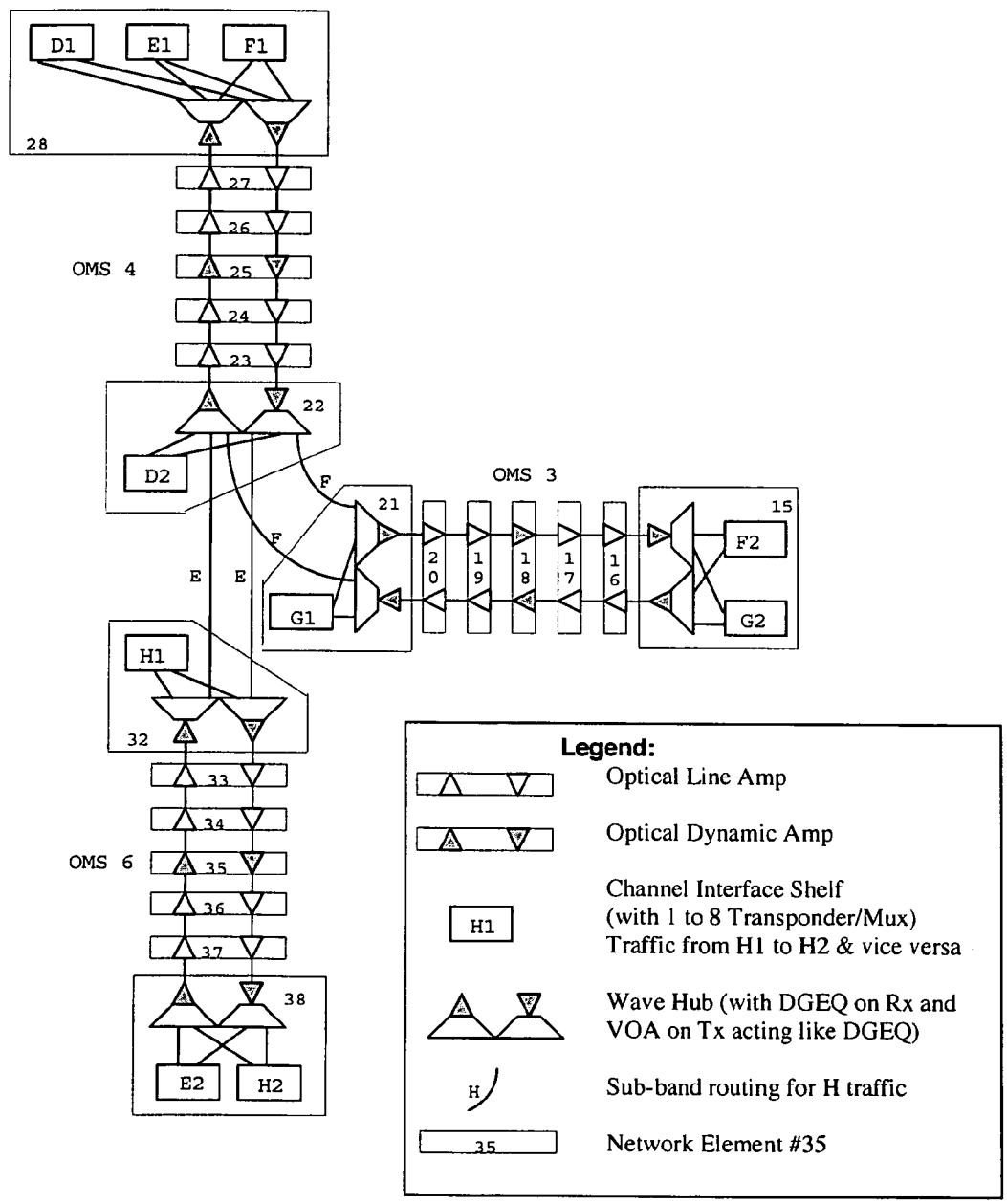
FIG. 12 is a block diagram of an exemplary optical network configuration.

To further illustrate the coordinated control approach of the present invention some exemplary situations are set forth below. The first situation involves a sudden failure of a single network element. Referring to FIG. 12, suppose interface shelf G1 is suddenly powered down (unplanned channel removal). This failure only affects OMS 3. Transient suppression will occur, and then NE 21 (optical line terminal, or OLT), NE 18 (Dynamic Amp) and NE 15 (OLT) will want to adjust DGEQ in a coordinated fashion. However, each may determine that they want to do DGEQ adjustments at the same time.

Before the failure, each NE is receiving a forward adjustment message indicating no upstream adjustment and is sending a forward adjustment message indicating no upstream adjustment (in each direction). After the failure, NE 21, NE 18 and NE 15 will, at slightly different times, detect the failure and perhaps decide that DGEQ adjustments are required.

Assume that NE 18 is the first to decide it wants to adjust its DGEQ in the east direction (the direction of the failure). It currently is receiving a forward adjustment message indicating no upstream adjustment from NE 19, so it sends a forward adjustment message indicating an upstream adjustment to NE 17. This forward adjustment message provides an adjustment priority for NE 18, indicates that the adjustment is local to the current OMS, as well as indicates that all active channels on the OMS are dependent. The forward adjustment message propagates to NE 16 and NE 15 unchanged. NE 15 in turn wants to route the message onwards. In this case, there is nowhere to send it, and thus the messages stops at NE 15.

Next, NE 15 realizes that it too wants to adjust its DGEQ. It is already receiving a forward adjustment message indicating an upstream adjustment for this direction, so it simply waits for the upstream adjustment to be completed.

NE 21 then realizes it wants to adjust its DGEQ. It is receiving a forward adjustment message indicating no upstream adjustment, so it sends a forward adjustment message indicating an upstream adjustment to NE 20. This forward adjustment message provides an adjustment priority for NE 21, indicates that the adjustment is local to the current OMS, as well as indicates that all active channels on the OMS are dependent. The forward adjustment message is propagated by NE 20 and NE 19 until it reaches NE 18.

NE 18 now realizes that there is a duplicate adjustment point that must be resolved. Since the received forward adjustment message indicating an upstream adjustment is local to the OMS, this is a simple case and NE 18 knows that it should immediately stop its adjustment and wait for the upstream adjustment to be completed. As a result, NE 18 modifies the forward adjustment message that it is sending to NE 17 to match the one being received from upstream. The modified forward adjustment message reaches NE 15 (who also wants to adjust its DGEQ). NE 15 does not care that the adjustment point changed from NE 18 to NE 21, and continues to wait.

Notice that along a given OMS the DGEQs can initially create DGEQ adjustment points out of order, but then things resolve themselves quickly (within a few seconds, or as fast as a few milliseconds). This type of approach is used for the following reasons.

First, for unplanned events (such as channel drops, component aging, etc.), one cannot carefully co-ordinate this among DGEQs, since the different NEs will discover this at different times due to the optical spectrum analyzer (OSA) sampling, and the current OSA activity (e.g. the OSA may be busy in a given NE for the other direction, and thus the detection time is slower).

Second, for a planned event such as a channel ramp-up or a channel ramp-down, the knowledge of the end of the ramp naturally propagates via the optical supervisory channel along the transmission path. Thus, upstream NEs will know before downstream NEs. This will cause upstream NEs to tend to become DGEQ adjustment points before downstream NEs. However, even this is not guaranteed since different applications (e.g., power management) may run at different speeds on different NEs.

Third, the actual DGEQ adjustment process is rather slow (i.e. a single adjustment cycle could take many seconds). Thus, the coordinated control protocol will tend to sort things out before a single update cycle can even complete.

Lastly, a simple delay can optionally be incorporated into the protocol so that when an NE wants to adjust its DGEQ and thinks that there is no adjustment occurring upstream, it immediately sends a forward adjustment message indicating an upstream adjustment downstream, but it waits before telling the DGEQ adjustment application for a short while to see if a forward adjustment message indicating an upstream adjustment will appear from upstream. The advantage is that this will tend to reduce the number of false starts (and cause less wear and tear on the OSA due to the switching of sampling points). The disadvantage is that the DGEQ adjustment is delayed.

When NE 21 is finished with its DGEQ adjustments (or at least ready to allow a downstream NE to start adjusting), it sends a forward adjustment message indicating no upstream adjustment downstream to NE 20. This is propagated to NE 19 and NE 18. At NE 18, the arrival of a forward adjustment message indicating no upstream adjustment means that it can now adjust its DGEQ. NE 18 sends a modified forward adjustment message downstream which indicates that an upstream adjustment is still occurring, but further provides its adjustment priority, indicates that the adjustment is local to the current OMS, and that all active channels in the OMS are affected.

When NE 18 is finished with its DGEQ adjustments (or at least ready to allow a downstream NE to start adjusting), it will send a forward adjustment message indicating no upstream adjustment. This will allow NE 15 to start adjusting its DGEQ. When NE 15 is finished, it sends forward adjustment message downstream indicating no upstream adjustment, and the scenario is finished, as there are no more NEs that wish to adjust their DGEQs.

A second exemplary situation involves different failures at different points in time. Suppose interface shelf D1 is powered down, and then a short time later (e.g. 5 seconds) interface shelf H1 is powered down. In this scenario, NE 28, NE 25, and NE 22 will want to perform DGEQ adjustments, but NE 28 will end up adjusting first. If NE 25 or NE 22 think they can adjust, they will yield when they see the forward adjustment message indicating an upstream adjustment from NE 28 as explained above. The forward adjustment message from NE 28 will proceed along OMS 4. Since traffic from OMS 4 is routed onto OMS 3 and OMS 6, when the forward adjustment message reaches NE 22, NE 22 will send the forward adjustment message onwards to its neighbors NE 21 and NE 32.

Prior to forwarding on the message, NE 22 modifies the message as follows. First, the local adjustment flag is changed to indicate that this is a non-local adjustment (since it is crossing OMS boundaries). However, as an optimization, since OMS 4 is a spur OMS, the local adjustment flag could be maintained. Second, the channel dependency is set to indicate the set of channels that is routed between the source OMS and the destination OMS. This list is set differently for each neighboring network element. In this example, the forward adjustment message sent to NE 21 indicates the set of active channels contained in sub-band F, whereas the forward adjustment message sent to NE 32 indicates the set of active channels contained in sub-band E. It is readily apparent that this technique works for both sub-band routing and individual channel routing.

NE 32 and NE 21 combine the forward adjustment message from all neighbors and sends a single modified forward adjustment message along the OMS. In this example, both NE 32 and 21 are receiving a single forward adjustment message from NE 22, and so it is sent unmodified along OMS 6 and OMS 3.

At this point, interface shelf H1 is powered down. NE 32, NE 35 and NE 38 all decide that they want to adjust their DGEQ (in the downward pointing direction), but they already know that an NE upstream is performing a DGEQ adjustment, since they are receiving a forward adjustment message indicating this. So, they wait.

The DGEQ adjustment point will pass from NE 28 to NE 25 to NE 22. When NE 22 is done with adjustments, it will send a forward adjustment message indicating no upstream adjustment and send it onwards to its neighbors NE 21 and NE 32. NE 21 and NE 32 will now be getting a forward adjustment message indicating no upstream adjustment from all neighbors, and so the forward adjustment message indicating no upstream adjustment is processed and possibly sent onwards. NE 32 will then see that it is its turn to adjust its DGEQ, and the adjustment point will later pass onto NE 35 and NE 38. On OMS 3, the forward adjustment message indicating no upstream adjustment will simply pass down the OMS unchanged since no NE along this OMS wishes to adjust its DGEQ.

In contrast, suppose interface shelf D1 and H1 are powered down at the same time. NE 28, NE 25 and NE 22 will want to adjust their DGEQ, and NE 28 will declare that it is adjusting its DGEQ and will send a forward adjustment message indicating an upstream adjustment downstream. In parallel, NE 32, NE 35 and NE 38 will want to adjust their DGEQ, and NE 32 will declare that it is adjusting its DGEQ and will send a forward adjustment message indicating an upstream adjustment downstream.

The forward adjustment message indicating upstream adjustment from NE 28 will reach NE 32 (passing through NE 22 and NE 32 as described above). NE 32 now realizes that there is a duplicate adjustment point, and carries out the arbitration scheme described above. In this case, the forward adjustment message that is coming from upstream indicates a non-local adjustment and the upstream adjustment priority is not higher (assuming in this example that it is simply based on the unique NE ID). So, NE 32 starts a short timer which expires. NE 32 then gives up and yields to the upstream adjustment point. NE 32 now waits for no upstream adjustment, and the forward adjustment message being received by NE 32 is forwarded onwards down OMS 6. The scenario then proceeds as described previously.

A network element, after deciding that it can adjust, may optionally wait a short while before starting the actual DGEQ adjustments. This small hold-off timer helps to avoid having dependent DGEQs adjust in parallel while a duplicate adjustment point is being sorted out. A downside, however, is that the DGEQ procedure is held off, perhaps unnecessarily. The other option is to start DGEQ right away, and then either pause it while a duplicate adjustment point is detected and sorted out, or let the DGEQ run in parallel for a short time. It is readily understood that the duplicate adjustment point resolution time is quite fast and is probably shorter than the time needed for even one DGEQ adjustment cycle (given the various OSA measurements that need to be taken).

As a further optimization, OMS 4 is a spur OMS in the south direction, i.e. NE 28 does not receive channels from any other NE. If the NEs on OMS 4 knew this (NE 28 could send a configuration indication to tell other NEs along the OMS), then the forward adjustment message indicating an upstream adjustment sent from NE 22 to NE 32 and NE 21 could indicate a local adjustment instead non-local adjustment. This would cause any NE along OMS 3 or OMS 6 to immediately yield their adjustment to the one upstream as if the forward adjustment message that was coming was upstream on the same OMS.

A third exemplary situation involves waiting for multiple upstream adjustments to complete. Suppose interface shelf E2 and F2 is powered down at the same time. NE 15, NE 18, NE 21, NE 38, NE 35, NE 32, NE 22, NE 25 and NE 28 all want to adjust their DGEQ. As in the previous scenarios, NE 15 starts adjusting its DGEQ, and will send a forward adjustment message indicating an upstream adjustment. So will NE 38. Since OMS 3 and OMS 6 have no dependence on each other in this direction of equalization, NE 38 and NE 15 can perform DGEQ in parallel. Depending on timing, NE 22 may initially think it can adjust its DGEQ, but will see a forward adjustment message indicating an upstream adjustment. NE 22 will then perform the arbitration scheme to resolve the duplicate adjustment points, thereby yielding to the upstream adjustment point immediately (assuming in this example that the adjustment priority is set to the unique NE ID, and since a higher NE ID is performing an adjustment, i.e. NE ID 38).

NE 22 is receiving a forward adjustment message indicating an upstream adjustment from both NE 21 and NE 32. It merges these two indications by merging the channel dependency lists, and the combined forward adjustment message is sent along OMS 4.

Along OMS 3, the DGEQ adjustment point will proceed from NE 15 to NE 18 to NE 21. When NE 21 is done, a forward adjustment message indicating no upstream adjustment will be sent to NE 22. At this point, NE22 is still receiving a forward adjustment message indicating upstream adjustment from NE 32, so it simply updates the merged indication (which now only has the information from NE 32). This means that DGEQ along OMS 4 are still waiting for an upstream DGEQ adjustment to complete.

Along OMS 6, the adjustment point will proceed from NE 38 to NE 35 to NE 32. When NE 32 is done, a forward adjustment message indicating no upstream adjustment is sent to NE 22. At this point, NE 22 is no longer receiving any forward adjustment message indicating an upstream adjustment, and so a forward adjustment message indicating no upstream adjustment is processed. NE 22 will see that it is its turn to adjust, and will send a forward adjustment message along OMS 4 indicating a local adjustment. The adjustment point will later move to NE 25 and then to NE 28. In this example, DGEQ adjustments along OMS 4 are held off until DGEQ adjustments along OMS 3 and along OMS 6 are completed. It should be noted that the DGEQ adjustments occurred in parallel between OMS 3 and OMS 6.

Figure 10:
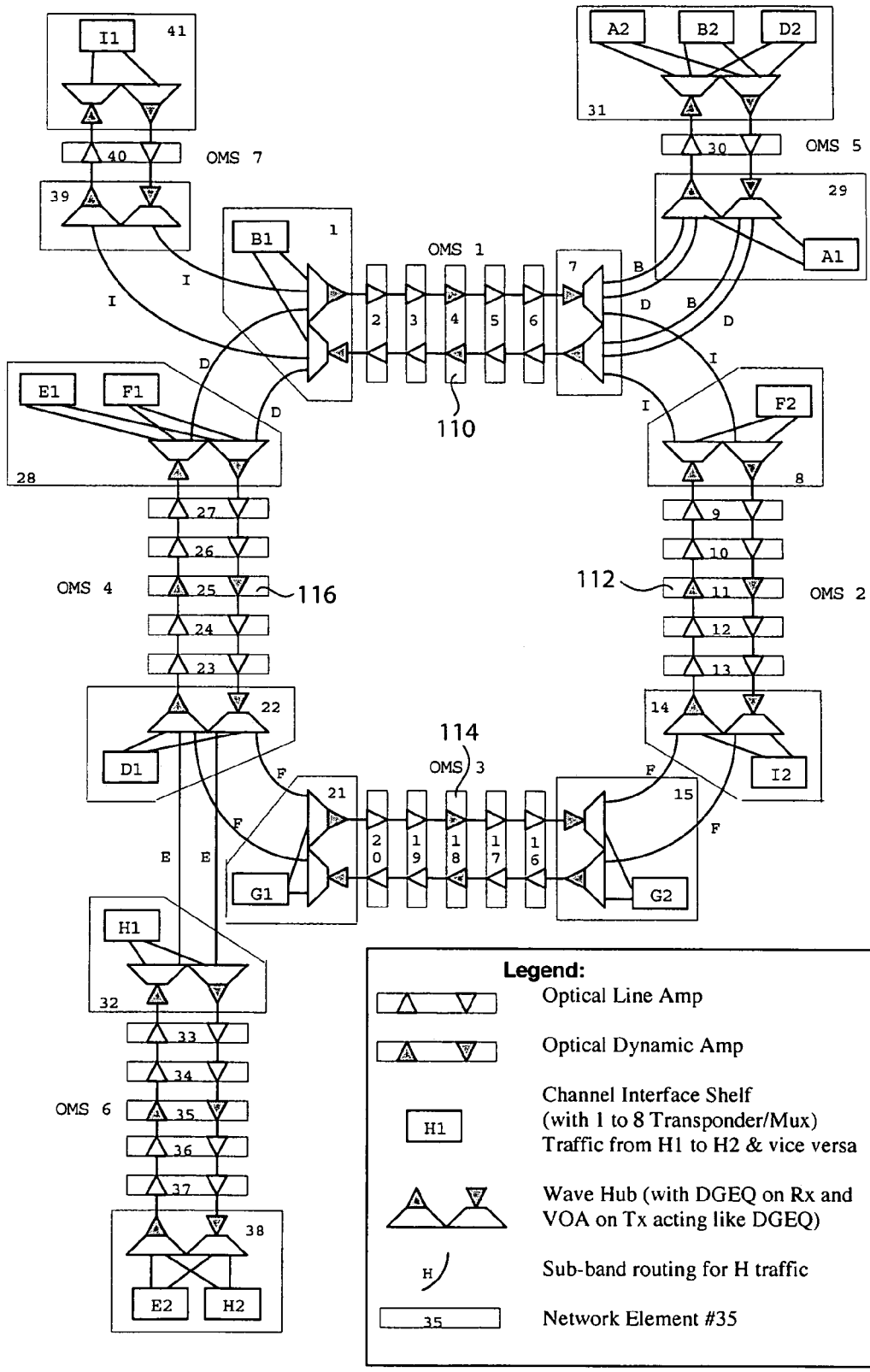

A fourth exemplary situation involves network configurations having loops in the transmission paths. Referring to FIG. 10, suppose interface shelf G1 is powered down. In this case, NE 21, NE 18 and NE 15 will all want to adjust their DGEQ. NE 21 will adjust first and will send a forward adjustment message indicating an upstream adjustment. This indication will proceed along OMS 3, where NE 15 will forward it along to OMS 2 with the channel dependency list set to the list of active channels in sub-band F. The forward adjustment message indicating an upstream adjustment will then proceed along OMS 2. NE 8 will only consider neighbors that receive channels that are specified in the channel dependency list of the forward adjustment message. In this example, the dependent channels all terminate at NE 8, and so a forward adjustment message indicating an upstream adjustment is not sent onwards. Thus, when DGEQ adjustments are being performed along OMS 3 in the east direction, only OMS 2 in the north direction is blocked from performing DGEQ adjustments.

NE 21, NE 18 and NE 15 will adjust their DGEQ in sequence. NE 15 will then send a forward adjustment message indicating no upstream adjustment to NE 14. NE 14 will see no upstream adjustment indications from all its neighbors, and will forward on a forward adjustment message indicating no upstream adjustment.

If no one along OMS 2 wants to adjust their DGEQ, then the forward adjustment message indicating no upstream adjustment will propagate along OMS 2, and will end there (since NE 8 is already sending a forward adjustment message indicating no upstream adjustment to all of its neighbors).

If a DGEQ along OMS 2, upon seeing no upstream adjustment, decides to adjust its DGEQ, then it will modify the forward adjustment message indicating an upstream adjustment that it is sending downstream to indicate that the adjustment point is now local and that all channels on the OMS are dependent. This updated forward adjustment message would reach NE 8 which would in turn send a forward adjustment message indicating an upstream adjustment to NE 7 indicating a non-local adjustment point and a channel dependency list with the active channels in sub-band 1. Since these two OMSs are dependent upon any DGEQ adjustments being performed in the north direction along OMS 2, this forward adjustment message would be propagated along OMS 1 and OMS 7.

This example shows that the forward adjustment message indicating an upstream adjustment travels only as far as it needs to given the current location of the DGEQ adjustment. As the adjustment point moves from one OMS to another, the set of affected downstream OMSs is changed, and the forward adjustment message indicating an upstream adjustment may travel further as a result.

A fifth exemplary situation involves a network configuration having loops and multiple adjustment points. Suppose NE 4 and NE 18 simultaneously decide to perform a DGEQ adjustment (in the clockwise direction) for whatever reason. NE 4 will send out a forward adjustment message indicating an upstream adjustment, and this will propagate along OMS 1, OMS 5 and OMS 2. Since the channel dependency list contains only the channels in sub-band 1, this message ends at NE 14 in OMS 2.

NE 18 will send out a forward adjustment message indicating an upstream adjustment which will propagate along OMS 3 and OMS 4. Since the channel dependency list contains only the channels in sub-band F, this message ends at NE 28 in OMS 4. Thus, NE 4 and NE 18 are allowed to perform DGEQ adjustments in parallel.

Suppose the adjustment point moves quicker along OMS 1 than it does along OMS 3. A forward adjustment message indicating no upstream adjustment is passed from NE 7 to NE 8 (and to NE 29), and now travels along OMS 2 (and OMS 5). Now suppose that an NE along OMS 2 (such as NE 11) decides it wants to adjust its DGEQ. As soon as it does this, a new forward adjustment message indicating an upstream adjustment is sent along OMS 2 indicating that all channels are dependent, and this causes NE 14 to send a forward adjustment message indicating an upstream adjustment onwards to NE 15 on OMS 3. This will in turn cause NE 18 to suddenly start seeing a forward adjustment message indicating an upstream adjustment while it is still performing DGEQ adjustments.

NE 18 now employs the arbitration scheme described above to resolve the duplicate adjustment points. Assume that the adjustment priority is based on the unique NE ID for this example. The received forward adjustment message indicates a non-local adjustment, and the received adjustment priority (from NE 11) is not higher. Thus, NE 18 starts a short timer. The timer expires and NE 18 is still seeing a forward adjustment message indicating an upstream adjustment, so it yields to the upstream adjustment point and waits for its turn (when there are no upstream adjustments occurring). NE 18 now forwards the received forward adjustment message along OMS 3. This message will also traverse along OMS 4 due to the channel dependency list (the active channels in sub-band F).

For a short time during the arbitration scheme, NE 18 and NE 11 are doing DGEQ adjustments in parallel. The adjustment hold-off timer is only used when a network element decides to do an adjustment and there was no upstream adjustment in progress. However, in this example, there was an upstream adjustment occurring (e.g. at NE 4) when NE 11 decided it wanted to adjust its DGEQ, and so NE 11 waited until it saw no adjustment occurring upstream. Once NE 11 received a forward adjustment message indicating no upstream adjustment, it immediately starts its DGEQ adjustments with no hold off.

A sixth exemplary situation involves multiple adjustment points occurring at the same time. For whatever reason, NE 4, NE 25, NE 18 and NE 11 all decide to adjust their DGEQ (in the counter-clockwise direction) at same time. The forward adjustment message indicating an upstream adjustment sent by NE 4 will reach NE 25 as well as flow along OMS 7. The forward adjustment message indicating an upstream adjustment sent by NE 25 will reach NE 18 and will also flow along OMS 6. The forward adjustment message indicating an upstream adjustment sent by NE 18 will reach NE 11. The forward adjustment message indicating an upstream adjustment sent by NE 11 will reach NE 4.

In this example, it is assumed that the contents (e.g. the channel dependency list) of a forward adjustment message will be modified to reflect the active channels routed from one OMS to another. However, the adjustment priority of a set of channels in the received forward adjustment message will be that of the originating network element. It is also assumed that the adjustment priority field of a forward adjustment message uses the unique NE ID.

NE 25 will start the duplicate adjustment point resolution timer, since it has a higher adjustment priority than NE 4. NE 18 will immediately yield to the upstream adjustment, since it has a lower adjustment priority than NE 25. NE 18 will now forward the received forward adjustment message, which will still flow along OMS 2 (following the routing of sub-band F). NE 11 will immediately yield to the upstream adjustment, since it has a lower adjustment priority than NE 18. It will start to forward the forward adjustment message from NE 18, and then this will change to the forward adjustment message from NE 25. NE 4 will immediately yield to the upstream adjustment, since it has a lower adjustment priority than NE 11. It will then forward the forward adjustment message from NE 11 (indicating an upstream adjustment), which will soon go away (i.e. change to a forward adjustment message indicating no upstream adjustment). This is because there is now no NE along OMS 2 doing a DGEQ adjustment (since NE 11 yielded to an upstream NE).

NE 25 will see the forward adjustment message indicating an upstream adjustment from NE 4 go away before its duplicate adjustment point resolution timer expires. It will thus stay as an adjustment point. However, it still lets the duplicate adjustment point timer run, and holds off performing DGEQ adjustments while it is running.

When the situation initially settles, NE 25 is still a DGEQ adjustment point, and its forward adjustment message indicating an upstream adjustment is reaching OMS 3 and OMS 2 (following the routing of active channels in sub-band F). Thus, NE 18 and NE 11 know that there is a DGEQ adjustment upstream, and thus wait. NE 4, however, still wants to do a DGEQ adjustment, and does not see any forward adjustment message indicating an upstream adjustment. It therefore thinks that it is its turn, and thus generates a forward adjustment message indicating an upstream adjustment which follows the routing of sub-band D to OMS 4.

NE 25 quickly sees a forward adjustment message indicating an upstream adjustment from NE 4 again. Once again, it holds its ground initially since it has a higher adjustment priority. NE 4, however, does not see any forward adjustment message indicating an upstream adjustment. The arbitration timer in NE 25 will then expire, NE 25 will yield to the upstream adjustment (NE 4) and will forward the forward adjustment message from NE 4 along OMS 4. Since the channels of sub-band D terminate there, this message stops at NE 22.

All of a sudden, NE 18 stops seeing a forward adjustment message indicating an upstream adjustment from NE 25 and thus wants to adjust its DGEQ. It therefore generates a forward adjustment message indicating an upstream adjustment, which flows along OMS 3, and follows the routing of channels in sub-band F to OMS 2. NE 11 sees this updated forward adjustment message indicating an upstream adjustment and keeps waiting.

When the situation settles, NE 4 and NE 18 are performing DGEQ. NE 11 and NE 25 are waiting for their turn. As noted above, the arbitration scheme provides a resolution very quickly (a few seconds) relative to the relatively long DGEQ adjustment cycle.

The coordinated control approach described above uses a forward adjustment messaging protocol among the various network elements in the network to coordinate themselves. However, the coordinated control approach of the present invention may also be implemented using a centralized control entity associated with the optical network. The centralized entity (e.g., a centralized processing entity) that is reachable via a wayside data communication subsystem from all network elements could be used as the coordinator. This central entity would require a complete view of the network, including the complete connectivity map of all the network elements, as well as a map of the optical channel flows throughout the network.

When a network element requires a DGEQ adjustment in a given transmission direction, it could send a request to the central entity. The central entity would receive all such requests, and compute in which order the DGEQs should be adjusted. The algorithm for serving the request may be the same as described above, i.e., upstream DGEQs are adjusted before downstream DGEQs. When there is a looped transmission path such that two DGEQs are both upstream of each other for certain optical channels, then the centralized entity can choose which one should go first using the same criteria as set forth above. The centralized entity would send a message to a network element when it is that network element's turn to adjust its DGEQ in a given direction. The network element would inform the centralized entity when it is completed, so that the central entity could choose the next network element. It is readily understood that multiple network elements in the network could still do parallel DGEQ adjustments when the network elements have no dependency on each other.

While a network element is making adjustments, another network element upstream may decide it wants to adjust its DGEQ. The central entity would be informed of this new adjustment request, would ask the current adjusting network element to stop, and then would tell the upstream network element that it can start adjusting. Once it has asked a given network element to start adjusting, the central entity can optionally run a safety timer. The network element is expected to report that it is completed before the expiration of this timer. If not, an error is declared and the central entity orders the network element in question to stop adjusting so that another network element can have its turn. One skilled in the art will readily understand how the concepts of the protocol described above may be extended to a coordinated control approach that employs such a centralized entity.

While the invention has been described in its presently preferred form, it will be understood that the invention is capable of modification without departing from the spirit of the invention as set forth in the appended claims.

What is claimed is:

1. A coordinated method for controlling dynamic gain equalization in an optical transport network having a plurality of network elements, comprising:

detecting a deviation in optical power of a first optical signal traversing the optical transport network along a transmission path and an oriciination point at which the deviation occurred in the optical transport network;

adjusting spectral profile of the first optical signal at a first network element in the optical transport network, the first network element being located in the transmission path of the optical signal downstream from the origination point; and adjusting spectral profile of the optical signal at a second network element based on the adjustment at the first network element, the second network element being located in the transmission path of the optical signal downstream from the origination point and the first network element, wherein the step of adjusting spectral profile at a first network element further comprises formulating a forward adjustment message at the first network element and propagating the forward adjustment message to other network elements located in the transmission oath downstream from the first network element.

2. The coordinated method of claim 1 wherein the step of formulating a forward adjustment message further comprises sending a forward adjustment message that indicates an upstream adjustment is in progress during the spectral profile adjustment operation at the first network element, and sending a forward adjustment message that indicates there is no upstream adjustment upon completion of the spectral profile adjustment operation at the first network element.

3. The coordinated method of claim 1 wherein the step of formulating a forward adjustment message further comprises defining a message format having an upstream adjustment indicator, a local adjustment indicator and a channel dependency list.

4. The coordinated method of claim 1 wherein the step of propagating the forward adjustment message further comprises transmitting the forward adjustment message over a data communication network.

5. The coordinated method of claim 1 wherein the step of propagating the forward adjustment message further comprises transmitting the forward adjustment message over an optical supervisory channel in the optical transport network.

6. The coordinated method of claim 1 wherein the step of propagating the forward adjustment message further comprises transmitting the forward adjustment message in a hop-by-hop manner to each network element in the transmission path.

7. The coordinated method of claim 2 wherein the step of adjusting spectral profile at a second network element further comprises initiating the spectral profile adjustment operation upon receipt of a forward adjustment message from the first network element which indicates that there is no upstream adjustment in progress.

8. The coordinated method of claim 7 wherein the step of adjusting spectral profile at a second network element further comprises formulating a different forward adjustment message at the second network element and propagating the different forward adjustment message to other network elements located in the transmission path downstream from the second network element.

9. The coordinated method of claim 1 further comprises communicating a request message to the centralized processing entity, and receiving an adjustment message at the second network element which indicates that there is an upstream adjustment in progress from the centralized processing entity prior to the step of adjusting spectral profile at a second network element.

10. The coordinated method of claim 9 further comprises sending a completion message from the first network element to the centralized processing entity upon completion of the spectral profile adjustment operation at the first network element;

sending an adjustment message from the centralized processing entity to the second network element which indicates that there is no upstream adjustment in progress; and initiating a spectral profile adjustment operation at the second network element upon receipt of the adjustment message from the centralized processing entity.

11. The coordinated method of claim 1 further comprises detecting a deviation in optical power of a second optical signal traversing the optical transport network along a second transmission path; and adjusting spectral profile of the second optical signal at a third network element in the optical transport network concurrently with the adjustment at the first network element when the second optical signal having no dependency on the first optical signal.

12. The coordinated method of claim 11 wherein the first optical signal embodies a first set of optical data channels and the second optical signal embodies a second set of optical data channels, such that the first set of optical data channels is mutually exclusive of the second set of optical data channels.

13. The coordinated method of claim 1 further comprises detecting the deviation in optical power of the first optical signal at a third network element substantially simultaneously with the step of detecting a deviation in optical power of the first optical signal at the first network element, the third network element being located in the transmission path of the first optical signal; and determining at which network element in the transmission path to perform a spectral profile adjustment; and performing a spectral profile adjustment operation at one of the first and third network elements.

14. The coordinated method of claim 13 wherein the step of determining at which network element further comprises performing an arbitration operation at each of the first and third network elements, thereby determining at which network element in the transmission path to perform a spectral profile adjustment.

15. The coordinated method of claim 14 wherein the step of determining at which network element further comprises selecting a network element that is located upstream from the other network element when the first and third network elements each reside in the same optical management section of the optical transport network.

16. The coordinated method of claim 14 wherein the step of determining at which network element further comprises selecting a network element is based on an adjustment priority.

17. The coordinated method of claim 13 wherein the step of determining at which network element further comprises communicating a request message from each of the first and third network elements to a centralized processing entity associated with the optical transport network, such that the centralized processing entity determines which network element is to perform a spectral profile adjustment operation.

18. The method of claim 1 wherein the first optical signal embodies a plurality of data channels, such that the spectral profile adjustment only affects a subset of the data channels embodied in the first optical signal.

19. The method of claim 18 wherein the step of formulating a forward adjustment message further comprises providing an indication of the subset of data channels being affected by the spectral profile adjustment.

20. The method of claim 19 wherein the optical transport network is comprised of a plurality of optical multiplex sections, such that the step of propagating the forward adjustment message further comprises transmitting the forward adjustment message only along optical multiplex sections which carry the subset of data channels affected by the spectral profile adjustment.

21. The method of claim 1 wherein the step of adjusting spectral profile at a second network element further comprises receiving a forward adjustment message from at least two upstream network elements, such that each forward adjustment message indicates that there is an upstream adjustment in progress, and initiating the spectral profile adjustment operation upon receipt of a subsequent forward adjustment message from each of the two upstream network elements which indicates there is no upstream adjustment.

22. A coordinated method for controlling dynamic gain equalization in an optical transport network having a plurality of network elements, comprising:

detecting a deviation in optical power of a first optical signal traversing the optical transport network along a transmission path, the deviation occurring at an origination in the optical transport network;

adjusting spectral profile of the first optical signal at a first network element in the optical transport network, the first network element being located in the transmission path of the optical signal downstream from the origination point;

adjusting spectral profile of the optical signal at a second network element based on and subsequent to the adjustment at the first network element, the second network element being located in the transmission path of the optical signal downstream from the origination point and the first network and communicating a request message to the centralized processing entity and receiving an adjustment message at the second network element which indicates that there is an upstream adjustment in progress from the centralized processing entity prior adiusting spectral profile at a second network element.

23. The coordinated method of claim 22 wherein the step of adjusting spectral profile at a first network element further comprises formulating a forward adjustment message at the first network element and propagating the forward adjustment message to other network elements located in the transmission path downstream from the first network element.

24. The coordinated method of claim 23 wherein the step of formulating a forward adjustment message further comprises sending a forward adjustment message that indicates an upstream adjustment is in progress during the spectral profile adjustment operation at the first network element, and sending a forward adjustment message that indicates there is no upstream adjustment upon completion of the spectral profile adjustment operation at the first network element.

25. The coordinated method of claim 23 wherein the step of formulating a forward adjustment message further comprises defining a message format having an upstream adjustment indicator, a local adjustment indicator and a channel dependency list.

26. The coordinated method of claim 23 wherein the step of propagating the forward adjustment message further comprises transmitting the forward adjustment message over a data communication network.

27. The coordinated method of claim 23 wherein the step of propagating the forward adjustment message further comprises transmitting the forward adjustment message over an optical supervisory channel in the optical transport network.

28. The coordinated method of claim 23 wherein the step of propagating the forward adjustment message further comprises transmitting the forward adjustment message in a hop-by-hop manner to each network element in the transmission path.

29. The coordinated method of claim 24 wherein the step of adjusting spectral profile at a second network element further comprises initiating the spectral profile adjustment operation upon receipt of a forward adjustment message from the first network element which indicates that there is no upstream adjustment in progress.

30. The coordinated method of claim 29 wherein the step of adjusting spectral profile at a second network element further comprises formulating a different forward adjustment message at the second network element and propagating the different forward adjustment message to other network elements located in the transmission path downstream from the second network element.

31. The coordinated method of claim 22 wherein the step of adjusting spectral profile at a first network element further comprises communicating a request message to a centralized processing entity associated with the optical transport network, and initiating the spectral profile adjustment operation upon receipt of an adjustment message from the centralized processing entity which indicates that there is no upstream adjustment in progress.

32. The coordinated method of claim 22 further comprises
sending a completion message from the first network element to the centralized processing entity upon completion of the spectral profile adjustment operation at the first network element;
sending an adjustment message from the centralized processing entity to the second network element which indicates that there is no upstream adjustment in progress; and
initiating a spectral profile adjustment operation at the second network element upon receipt of the adjustment message from the centralized processing entity.

33. The coordinated method of claim 22 further comprises
detecting a deviation in optical power of a second optical signal traversing the optical transport network along a second transmission path; and
adjusting spectral profile of the second optical signal at a third network element in the optical transport network concurrently with the adjustment at the first network element when the second optical signal having no dependency on the first optical signal.

34. The coordinated method of claim 33 wherein the first optical signal embodies a first set of optical data channels and the second optical signal embodies a second set of optical data channels, such that the first set of optical data channels is mutually exclusive of the second set of optical data channels.

35. The coordinated method of claim 22 further comprises
detecting the deviation in optical power of the first optical signal at a third network element substantially simultaneously with the step of detecting a deviation in optical power of the first optical signal at the first network element, the third network element being located in the transmission path of the first optical signal; and determining at which network element in the transmission path to perform a spectral profile adjustment; and
performing a spectral profile adjustment operation at one of the first and third network elements.

36. The coordinated method of claim 35 wherein the step of determining at which network element further comprises performing an arbitration operation at each of the first and third network elements, thereby determining at which network element in the transmission path to perform a spectral profile adjustment.

37. The coordinated method of claim 36 wherein the step of determining at which network element further comprises selecting a network element that is located upstream from the other network element when the first and third network elements each reside in the same optical management section of the optical transport network.

38. The coordinated method of claim 36 wherein the step of determining at which network element further comprises selecting a network element is based on an adjustment priority.

39. The coordinated method of claim 35 wherein the step of determining at which network element further comprises communicating a request message from each of the first and third network elements to a centralized processing entity associated with the optical transport network, such that the centralized processing entity determines which network element is to perform a spectral profile adjustment operation.

40. The method of claim 23 wherein the first optical signal embodies a plurality of data channels, such that the spectral profile adjustment only affects a subset of the data channels embodied in the first optical signal.

41. The method of claim 40 wherein the step of formulating a forward adjustment message further comprises providing an indication of the subset of data channels being affected by the spectral profile adjustment.

42. The method of claim 41 wherein the optical transport network is comprised of a plurality of optical multiplex sections, such that the step of propagating the forward adjustment message further comprises transmitting the forward adjustment message only along optical multiplex sections which carry the subset of data channels affected by the spectral profile adjustment.

43. The method of claim 23 wherein the step of adjusting spectral profile at a second network element further comprises receiving a forward adjustment message from at least two upstream network elements, such that each forward adjustment message indicates that there is an upstream adjustment in progress, and initiating the spectral profile adjustment operation upon receipt of a forward adjustment message from each of the two upstream network elements which indicates there is no upstream adjustment.

44. A coordinated method for controlling dynamic gain equalization in an optical transport network having a plurality of network elements, comprising:
detecting a deviation in optical power of a first optical signal traversing the optical transport network along a transmission path and an origination point at which the deviation occurred in the optical transport network
adjusting spectral profile of the first optical signal at a first network element in the optical transport network, the first network element being located in the transmission path of the optical signal downstream from the origination point; and
adjusting spectral profile of the optical signal at a second network element based on the adjustment at the first network element, the second network element being located in the transmission path of the optical signal downstream from the origination point and the first network element, wherein adjusting spectral profile at a first network element further comprises communicating a request message to a centralized processing entity associated with the optical transport network, and initiating the spectral profile adjustment operation upon receipt of an adjustment message from the centralized processing entity which indicates that there is no upstream adjustment in progress.

45. A coordinated method for controlling dynamic gain equalization in an optical transport network having a plurality of network elements, comprising:

detecting a deviation in optical power of a first optical signal traversing the optical transport network along a transmission path and an origination point at which the deviation occurred in the optical transport network adjusting spectral profile of the first optical signal at a first network element in the optical transport network, the first network element being located in the transmission path of the optical signal downstream from the origination point;

adjusting spectral profile of the optical signal at a second network element based on the adjustment at the first network element, the second network element being located in the transmission path of the optical signal downstream from the origination point and the first network element;

detecting the deviation in optical power of the first optical signal at a third network element substantially simultaneously with the step of detecting a deviation in optical power of the first optical signal at the first network element, the third network element being located in the transmission path of the first optical signal;

determining at which network element in the transmission path to perform a spectral profile adjustment; and performing a spectral profile adjustment operation at one of the first and third network elements.

46. The coordinated method of claim 45 wherein the step of determining at which network element further comprises performing an arbitration operation at each of the first and third network elements, thereby determining at which network element in the transmission path to perform a spectral profile adjustment.

47. The coordinated method of claim 46 wherein the step of determining at which network element further comprises selecting a network element that is located upstream from the other network element when the first and third network elements each reside in the same optical management section of the optical transport network.

48. The coordinated method of claim 46 wherein the step of determining at which network element further comprises selecting a network element is based on an adjustment priority.

49. The coordinated method of claim 45 wherein the step of determining at which network element further comprises communicating a request message from each of the first and third network elements to a centralized processing entity associated with the optical transport network, such that the centralized processing entity determines which network element is to perform a spectral profile adjustment operation.

* * * * *